US011073225B2

(12) United States Patent
Klyashitsky et al.

(10) Patent No.: US 11,073,225 B2
(45) Date of Patent: Jul. 27, 2021

(54) ROTARY STEPPING ACTUATOR FOR VALVE

(71) Applicant: Master Flo Valve Inc., Edmonton (CA)

(72) Inventors: Yan Gregory Klyashitsky, Edmonton (CA); Anwar Abdul Sleiman, Edmonton (CA)

(73) Assignee: Master Flo Valve Inc., Edmonton (CA)

( * ) Notice: Subject to any disclaimer, the term of this patent is extended or adjusted under 35 U.S.C. 154(b) by 163 days.

(21) Appl. No.: 16/155,730

(22) Filed: Oct. 9, 2018

(65) Prior Publication Data
US 2019/0107222 A1 Apr. 11, 2019

Related U.S. Application Data

(60) Provisional application No. 62/571,065, filed on Oct. 11, 2017.

(51) Int. Cl.
| *F16K 31/50* | (2006.01) |
| *E21B 34/02* | (2006.01) |
| *F16K 31/122* | (2006.01) |
| *F16K 3/24* | (2006.01) |
| *F16K 31/163* | (2006.01) |

(52) U.S. Cl.
CPC ............ *F16K 31/508* (2013.01); *E21B 34/02* (2013.01); *F16K 3/246* (2013.01); *F16K 31/1221* (2013.01); *F16K 31/163* (2013.01)

(58) Field of Classification Search
CPC .. F16K 31/508; F16K 31/163; F16K 31/1221; F16K 31/047; F16K 31/12; F16K 3/246; E21B 34/02; F16H 31/001; F16H 31/003
See application file for complete search history.

(56) References Cited

U.S. PATENT DOCUMENTS

| 1,176,185 | A | * | 3/1916 | Waltz | .................... F16H 31/001 |
| | | | | | 74/136 |
| 3,656,596 | A | * | 4/1972 | Morgan | ............... B66D 1/7431 |
| | | | | | 192/17 R |
| 4,180,238 | A | | 12/1979 | Muchow | |
| 4,403,523 | A | | 9/1983 | Seger | |
| 4,534,235 | A | | 8/1985 | Mitcham et al. | |

(Continued)

FOREIGN PATENT DOCUMENTS

WO 2007/134088 11/2007

*Primary Examiner* — Kelsey E Cary

(74) *Attorney, Agent, or Firm* — Leydig, Voit & Mayer, Ltd.

(57) ABSTRACT

Valve system with rotary stepping actuator to actuate a valve stem. An actuator drive shaft supported for stepwise rotation imparts rotation to a valve stem nut to axially move a valve stem to open and close valve flow trim. The drive shaft forms peripheral first and second slotted circular drive paths co-axially spaced from each other. Actuation assemblies releasably engage forward or reverse ratchet pawls in a drive shaft slot to incrementally rotate the drive shaft in forward or reverse steps. One or both of the forward and reverse ratchet pawls is one of a plurality of ratchet pawls, such that each forward or reverse step by one of the plurality of ratchet pawls incrementally rotates the drive shaft through a partial forward or reverse step which is a fraction of a predetermined angular increment set by the slot spacing.

32 Claims, 15 Drawing Sheets

(56) References Cited

U.S. PATENT DOCUMENTS

| | | | |
|---|---|---|---|
| 4,540,022 A | 9/1985 | Cove | |
| 4,541,295 A | 9/1985 | Cove | |
| 4,570,724 A | 2/1986 | Robison | |
| 4,771,807 A | 9/1988 | Karanni | |
| 5,431,188 A | 7/1995 | Cove | |
| 5,549,013 A | 8/1996 | Kimbara | |
| 5,577,436 A | 11/1996 | Kimbara | |
| 6,782,949 B2 | 8/2004 | Cove et al. | |
| 6,988,554 B2 | 1/2006 | Bodine et al. | |
| 7,237,472 B2 | 7/2007 | Cove | |
| 7,287,739 B2 | 10/2007 | Arnison et al. | |
| 7,426,938 B2 | 9/2008 | Bohaychuk et al. | |
| 8,261,625 B2 | 9/2012 | Picerno et al. | |
| 8,371,333 B2 | 2/2013 | Bohaychuk | |
| 8,402,996 B2 | 3/2013 | Piwonka | |
| 8,803,388 B2 | 8/2014 | Keefover et al. | |
| 9,141,130 B2 | 9/2015 | Ellison | |
| 9,458,941 B2 | 10/2016 | Bohaychuk | |
| 2009/0160275 A1 | 6/2009 | Keefover et al. | |
| 2013/0256570 A1 | 10/2013 | McHugh et al. | |
| 2015/0316169 A1* | 11/2015 | Bohaychuk | F16K 31/047 251/58 |
| 2018/0058602 A1* | 3/2018 | Yates | F16K 3/0254 |

\* cited by examiner

ROTARY STEPPING ACTUATOR FOR VALVE

CROSS REFERENCE TO RELATED APPLICATIONS

This application claims priority from U.S. Provisional Patent Application No. 62/571,065 filed Oct. 11, 2017, which is incorporated by reference herein to the extent that there is no inconsistency with the present disclosure.

FIELD OF THE INVENTION

This invention relates to a rotary stepping actuator for a valve, a method for stepwise opening and closing a valve with a rotary stepping actuator and a valve system with a rotary stepping actuator.

BACKGROUND

A choke valve is a particular type of valve commonly used as part of an oil or gas field wellhead. It functions to throttle and reduce the pressure of the fluid flowing through the valve. Choke valves are placed on the production "tree" of an oil or gas wellhead assembly to control the flow of produced fluid from a reservoir into the production flow line. They are used on wellheads located on land (surface) and offshore (platform), as well as on wellheads located beneath the surface of the ocean (subsea). Choke valves common to oil and gas field use are generally described in U.S. Pat. No. 4,540,022, issued Sep. 10, 1985, to Cove and U.S. Pat. No. 5,431,188, issued Jul. 11, 1995 to Cove. A subsea choke valve equipped with pressure transmitters is described in U.S. Pat. No. 6,782,949, issued Aug. 31, 2004 to Cove et al. All of these patents are assigned to Master Flo Valve, Inc. (Master Flo), the owner of this application.

In general, choke valves include:

a valve body having an axial bore, a body inlet (typically oriented as a side inlet to the axial bore) and a body outlet (typically referred to as an bottom or end outlet, aligned with the axial bore);

a "flow trim" mounted in the bore between inlet and outlet, for throttling the fluid flow moving through the body; and means including a stem and bonnet assembly for actuating the flow trim to open and close the choke valve, and for closing the upper end of the axial bore remote from the outlet.

There are four main types of flow trim commonly used in commercial chokes, each of which includes a port-defining member forming one or more flow ports, a movable member for throttling the flow ports, and seal means for implementing a total shut-off. These four types of flow trim can be characterized as follows:

(1) a needle and seat flow trim comprising a tapered annular seat fixed in the valve body and a movable tapered internal plug for throttling and sealing in conjunction with the seat surface;

(2) a cage with internal plug flow trim, comprising a tubular, cylindrical cage, fixed in the valve body and having ports in its side wall, and a plug movable axially through the bore of the cage to open or close the ports. Shut-off is generally accomplished with a taper on the leading edge of the plug, which seats on a taper carried by the cage or body downstream of the ports;

(3) a multiple-port disc flow trim, having a fixed ported disc mounted in the valve body and a rotatable ported disc, contiguous therewith, that can be turned to cause the two sets of ports to move into or out of register, for throttling and shut-off; and (4) a cage with external sleeve flow trim, comprising a tubular cylindrical cage having ports in its side wall and a hollow cylindrical external sleeve (also termed external flow collar) that slides axially over the cage to open and close the ports. The shut-off is accomplished with the leading edge of the sleeve contacting an annular seat carried by the valve body or cage.

In the above choke valves, the flow trim is positioned within the choke valve at the intersection of the inlet and outlet. Commonly, the flow trim includes a stationary tubular cylinder referred to as a "cage", positioned transverse to the inlet and having its bore axially aligned with the outlet. The cage has one or more restrictive flow ports extending through its sidewall. Fluid enters the cage from the choke valve inlet, passes through the flow ports and changes direction to leave the cage bore through the valve outlet.

Maintenance on the deep subsea wellhead assemblies cannot be performed manually. An unmanned, remotely operated vehicle (ROV), is used to approach the wellhead and carry out maintenance functions. To aid in servicing subsea choke valves, choke valves have their internal components, including the flow trim, assembled into a modular sub-assembly. The sub-assembly is referred to as an "insert assembly" and is inserted into the choke valve body and clamped into position.

When the flow trim becomes worn beyond its useful service life due to erosion and corrosion caused by particles and corrosive agents in the produced substances, an ROV is used to approach the choke valve, unclamp the insert assembly from the choke valve body and attach a cable to the insert assembly so that it may be raised to the surface for replacement or repair. The ROV then installs a new insert assembly and clamps it into position. This procedure eliminates the need to raise the whole wellhead assembly to the surface to service a worn choke valve.

In order to efficiently produce a reservoir, it is necessary to monitor the flow rate of the production fluid. This is done to ensure that damage to the formation does not occur and to ensure that well production is maximized. This process has been, historically, accomplished through the installation of pressure and temperature transmitters into the flow lines upstream and downstream of the choke valve. The sensor information is then sent to a remote location for monitoring, so that a choke valve controller can remotely bias the flow trim to affect the desired flow rate. The controller sends electrical signals to actuator means, associated with the choke valve, for adjusting the flow trim.

Fine control over the position of the flow trim is desired. Choke valves are equipped with a means to provide position control. In the most fundamental form, manual operation by a lever or hand wheel is used. To provide remote control of a choke valve's position a variety of actuators, including hydraulic rotary stepping actuators, can be used.

U.S. Pat. No. 6,988,554 issued Jan. 24, 2006 to Bodine et al., describes known hydraulic actuator control systems for the environment of subsea choke valves, noting that it is common for more than one well to be produced through a single flow line, with products from each individual well flow being combined into a common flow line to carry the products to the surface or to combine those products with the products of other flow lines. This patent indicates a difficulty in managing a multiple well completion produced through a single flow line is that not all of the wells may be producing at the same pressure conditions or include the same flow constituents (liquids and gases). Thus, if one well is producing at a lower pressure than the pressure maintained in the flow line, fluid can back flow from the flow line into that well. The loss of production fluids is undesirable, and the pressure changes and reverse flow conditions within that well can damage the well and/or reservoir. Similarly, if one well is producing at a pressure above the flow line pressure, that well may produce at an undesirable flow rate and pressure, again with the potential to damage other wells and/or the reservoir. Thus, management of flow rates and pressures is of critical importance in maximizing the production of hydrocarbons from the reservoir.

In a typical prior art subsea production system, control signals and a hydraulic fluid supply are transmitted along an umbilical from a topside control system to a subsea control module which supplies hydraulic fluid to actuators in the subsea trees. As control valves within the control module receive signals to open or close the choke, the control valves actuate to control the flow of hydraulic fluid to the choke actuator through separate hydraulic lines for opening or closing the choke. A common choke actuator is a hydraulic stepping actuator, which may, for example, take 100 to 200 steps to close. For each step the actuator receives a pulse of hydraulic pressure, which moves the actuator, followed by a release of that pressure, which allows a spring to return the actuator to its initial position. In typical systems, the SCM (subsea control module) is located proximate (e.g., within about 30 feet) to the choke/actuator, and about one second is required for the pressure pulse to travel from the control valve in SCM to the actuator and two seconds are required for the spring to return the actuator to its initial position. With a total of three seconds per step and a total of up to 200 or more steps needed to fully actuate the choke, the time required to fully close or open the choke is considerable. The risk of equipment failure is also increased due to the high frequency of the components being actuated.

Hydraulic or pneumatic stepping actuators commonly used in choke actuation convert the linear motion from hydraulic or pneumatic actuation into rotational motion imparted to an externally threaded stem of the flow trim to open or close the flow trim. These cylinders move linearly in response to a pressurized fluid to stepwise drive actuation components then return to their initial positions using a biasing spring. Thus, each pressure pulse from a directional control valve rotates the choke actuator a certain increment causing linear i.e., translational), axial adjustment of the flow trim in the choke insert.

Early versions of prior art bi-directional rotary stepping actuators adapted for use with a choke valves are described in U.S. Pat. No. 4,180,238, issued Dec. 25, 1979 to Muchow, and U.S. Pat. No. 4,541,295, issued Sep. 17, 1985 to Cove. The patents describes rotary bi-directional valve actuators including a pair of cranks and ratchet pawls to couple and disengage with one or more ratchet wheels fixed to a stem nut to impart stepwise rotation motion in a clockwise or counterclockwise direction to the stem nut, which in turn moves the valve stem to close or open the valve trim. Hydraulic cylinders are used to drive the dual ratchet mechanisms in opposite directions.

FIGS. 1-3, described below in greater detail, show an embodiment of a Master Flo prior art subsea rotary stepping actuator connected through the stem bonnet assembly to a valve body of a subsea choke. As with the above-mentioned rotary stepping actuators, the angular increments imparted to a stem nut are matched in the clockwise and counterclockwise directions of rotation, and the translational movement imparted to the valve trim with each step is also the same in the opening and closing direction. Thus fine control over the position of the flow trim is set by the angular increments imparted to the stem nut. While fine control can be somewhat addressed by increasing the number of angular increments (steps) needed to open and close the valve, as noted above, for most valves the number of steps to fully open or close the valve is in the order of 100-200 steps, so further increasing the number of steps significantly increases the time needed for each of the opening and closing operations.

U.S. Pat. No. 9,458,941 issued Oct. 4, 2016, to Bohaychuk describes a Master Flo rotary bi-directional stepping actuator having a slotted drive shaft which is hydraulically actuated in opposite directions by a forward ratchet pawl and a reverse ratchet pawl in order to open and close the flow trim of a valve. The slots in the drive shaft for the opening and the closing operations are matched in number, size and spacing, but are rotationally offset from each other by a set fraction, such as by one half of the slot spacing. Actuation provides separate forward and reverse actuation cycles to the drive shaft to incrementally rotate the drive shaft in predetermined angular increments (steps) set by the slot spacing. Due to the offset, a counter step in a direction counter to the direction of a directly preceding step rotates the drive shaft by an amount less than the predetermined angular increment, as determined by the set fraction. If the set fraction is one half, the counter step rotates the drive shaft by a half step, while the next following step in the same counter direction is a full step in the predetermined angular increment. While this provides a degree of fine control to the position of the flow trim, in general, to achieve a "half step" in the opening direction, it is necessary to first open the valve trim by a full step, and then close the valve trim in a reverse half step. In some applications, overstepping in the opening direction, is undesirable, for example due to pressure changes in the well or reservoir caused by overstepping in the open direction.

SUMMARY

In one embodiment, there is provided a valve system, including:

(i) a valve body configured with an inlet and an outlet and having flow trim configured to be moved axially by an externally threaded valve stem between a closed position, wherein flow through the valve body is restricted, and an open position, wherein fluid may enter the valve body through the inlet, pass through the flow trim at reduced pressure, and continue through the outlet;

(ii) a stem/bonnet assembly connected to the valve body and including a bonnet disengagably connected with, and closing, an upper end of the valve body, the threaded valve stem extending through the bonnet, and a stem nut coaxial with the threaded valve stem and having internal threads cooperatively engaged with the externally threaded valve stem;

(iii) an actuator housing coupled to the stem/bonnet assembly and forming an entry port for sealed entry and rotational mounting of the stem nut;

(iv) an actuator drive shaft supported in the actuator housing for stepwise rotation, the drive shaft being co-axially aligned with, and configured to be rotatably coupled directly or indirectly to, the stem nut to impart rotation to the stem nut, the drive shaft forming at a periphery a first circular drive path and a second circular drive path co-axially spaced from the first drive path, each of the first and second drive paths comprising a number of outwardly-opening, circumferentially-spaced openings, the openings in the first and second drive paths being matched in number, size and spacing, wherein the spacing of the openings sets a predetermined angular increment for the stepwise rotation of the drive shaft;

(v) a first actuation assembly mounted in the actuator housing adjacent the first drive path of the drive shaft and moveable from a retracted position through a forward actuation cycle, and operative to releasably engage a forward ratchet pawl in one of the openings in the first drive path to incrementally rotate the drive shaft in a forward step;

(vi) a second actuation assembly mounted in the actuator housing adjacent the second drive path of the drive shaft and moveable from a retracted position through a reverse actuation cycle, and operative to releasably engage a reverse ratchet pawl in one of the openings in the second drive path to incrementally rotate the drive shaft in a reverse step;

(vii) an actuation control system coupled with the actuator housing and configured to supply a discrete quantity of pressurized fluid to separately drive the first and second actuation assemblies to impart rotational movement to the drive shaft in the forward and reverse actuation cycles to move the flow trim in the forward and reverse steps between the open and closed positions; and (viii) wherein one or both of the forward ratchet pawl and the reverse ratchet pawl is one of a plurality of ratchet pawls arranged in the first drive path or the second drive path such that in each of the forward or reverse actuation cycles for which a plurality of ratchet pawls is present, a first of the plurality of ratchet pawls engages in the opening while the other of the plurality of ratchet pawls remain disengaged from the opening, in order to incrementally rotate the drive shaft though a partial forward step or a partial reverse step which is a fraction of the predetermined angular increment, the fraction being set by the number of forward or reverse ratchet pawls in the plurality of ratchet pawls, and such that in each second or further forward or reverse actuation cycle for which a plurality of ratchet pawls is present, only a next one of the plurality of ratchet pawls engages in the opening, while the other of the plurality of ratchet pawls remain disengaged from the opening, in order to incrementally rotate the drive shaft through the partial forward or the partial reverse step, and so on for each further forward or reverse actuation cycle for which a plurality of ratchet pawls is present until each of the plurality of ratchet pawls has been engaged in the partial forward step or the partial reverse step, at which time the sum of the partial forward steps or the partial reverse steps achieved by engaging each one of the plurality of ratchet pawls is the predetermined angular increment set by the spacing of the openings.

The valve system provides fine control in one or both of the valve opening and closing operations, while still maintaining sufficient slot sizing and strength in the drive shaft. This fine control is provided without complicating the actuation control system, for instance without increasing the number of hydraulic actuators needed for each of the forward and reverse actuation cycles.

In some embodiments, the plurality of ratchet pawls are circumferentially spaced in one or both of the first and second drive paths, with the spacing between the ratchet pawls being adapted to ensure only one of the ratchet pawls is engaged in an opening while the remaining ratchet pawls remain disengaged. In some embodiments, the spacing of the plurality of ratchet pawls is defined by the equation:

$$D = 360 * X / P * S,$$

wherein,
D is the angular spacing of the ratchet pawls,
X is a positive integer,
P is the number of ratchet pawls in the plurality of ratchet pawls, and
S is the number of openings or slots,
provided that D is not a multiple of 360/S.

In some embodiments, the openings are axial slots and the number of slots in each of the first and second drive paths is between 5 and 20 so that the predetermined angular increments imparted in the full forward step and the full reverse step is between about 18 and 72°.

In some embodiments the number of slots in each of the first and second drive paths is 10 so that the predetermined angular increment imparted is about 36°, and the number of the forward or reverse ratchet pawls is 3 arranged to provide the partial forward or reverse steps in angular increments of about 12°.

In some embodiments of the valve system, the actuation control system comprises two hydraulic cylinders connected to the actuator housing, each cylinder having a supply of hydraulic fluid and a piston adapted to extend into the actuator housing; and the first and second actuation assemblies each comprise:

a drive collar mounted co-axially around either the first drive path or the second drive path for rotational movement in a radial arc about the first or second drive path;

the openings in the drive shaft being slots extending axially along the rotational axis;

each of the plurality of forward ratchet pawls and the single reverse ratchet pawl being pivotally connected with the drive collar and being spring biased to be pivotally movable between an engaged position within one of the slots of the first or second drive paths and a disengaged position released from the slot with each rotation of the drive collar; and a connecting arm oriented tangentially to the drive collar and pivotally connected between the piston of one of the hydraulic cylinders and a compression spring, the connecting arm having a central portion pivotally connected to the drive collar, so that the supply of the hydraulic fluid to extend the piston causes the connecting arm to impart radial rotational movement to the drive collar in a driven step to move the one of the plurality of forward ratchet pawls or the single reverse ratchet pawls into the engaged position with one of the slots of the drive shaft, and retraction of the piston with the compression spring causes the connecting arm to impart radial rotational movement to the drive collar in a return step in an opposite direction to move the one of the plurality of forward ratchet pawls or the single reverse ratchet pawl into the disengaged position, released from the slot of the drive shaft.

In some embodiments of the valve system, each of the plurality of forward ratchet pawls and the single reverse ratchet pawls is connected and positioned in the drive collar relative to the drive shaft and the slots such that, if the particular ratchet pawl to be engaged is not aligned with the slot to be engaged at the commencement of the actuation cycle, the particular ratchet pawl remains out of engagement with the slot, and instead engages the periphery of the drive shaft to delay engaging the slot by the fraction or a multiple of the fraction of the predetermined angular increment set by the slot spacing.

Also provided is a rotary stepping actuator including the components (iii)-(viii) as above.

Also provided is a method opening and closing the flow trim of a valve with a rotary stepping actuator by imparting stepwise rotation to a drive shaft rotationally coupled to the flow trim through a stem nut and a valve stem in a manner to impart axial movement to the flow trim with each stepwise rotation of the drive shaft. The method comprises supplying pressurized fluid to stepwise and separately drive first and second actuation assemblies in opposite directions to impart stepwise rotational movement to the drive shaft such that the drive shaft is stepwise rotated by a predetermined angular increment or by a fraction of the predetermined angular increment for one or both of each forward step and each reverse step of the drive shaft to move the flow trim axially in steps between an open position and a closed position.

In some embodiments of the method, the predetermined angular increment is set by the spacing of a number of circumferentially-spaced openings in the drive shaft, so that the method includes:

incrementally rotating the drive shaft in a forward actuation cycle for valve opening by imparting stepwise rotational movement to the drive shaft such that the drive shaft is stepwise rotated by the fraction of the predetermined angular increment, and incrementally rotating the drive shaft in a reverse actuation cycle for valve closing by imparting stepwise rotational movement to the drive shaft such that the drive shaft is stepwise rotated by the predetermined angular increment.

In some embodiments, the method includes:

the forward actuation cycle selectively and sequentially engaging and disengaging each one of a plurality of forward ratchet pawls in one of the openings to incrementally rotate the drive shaft by the fraction of the predetermined angular increment, while maintaining the other of the plurality of forward ratchet pawls disengaged from the openings;

the fraction being set by the number of the plurality of forward ratchet pawls; and the reverse actuation cycle engaging and disengaging a single reverse ratchet pawl in one of the openings to incrementally rotate the drive shaft by the predetermined angular increment.

DETAILED DESCRIPTION

Figure 1:
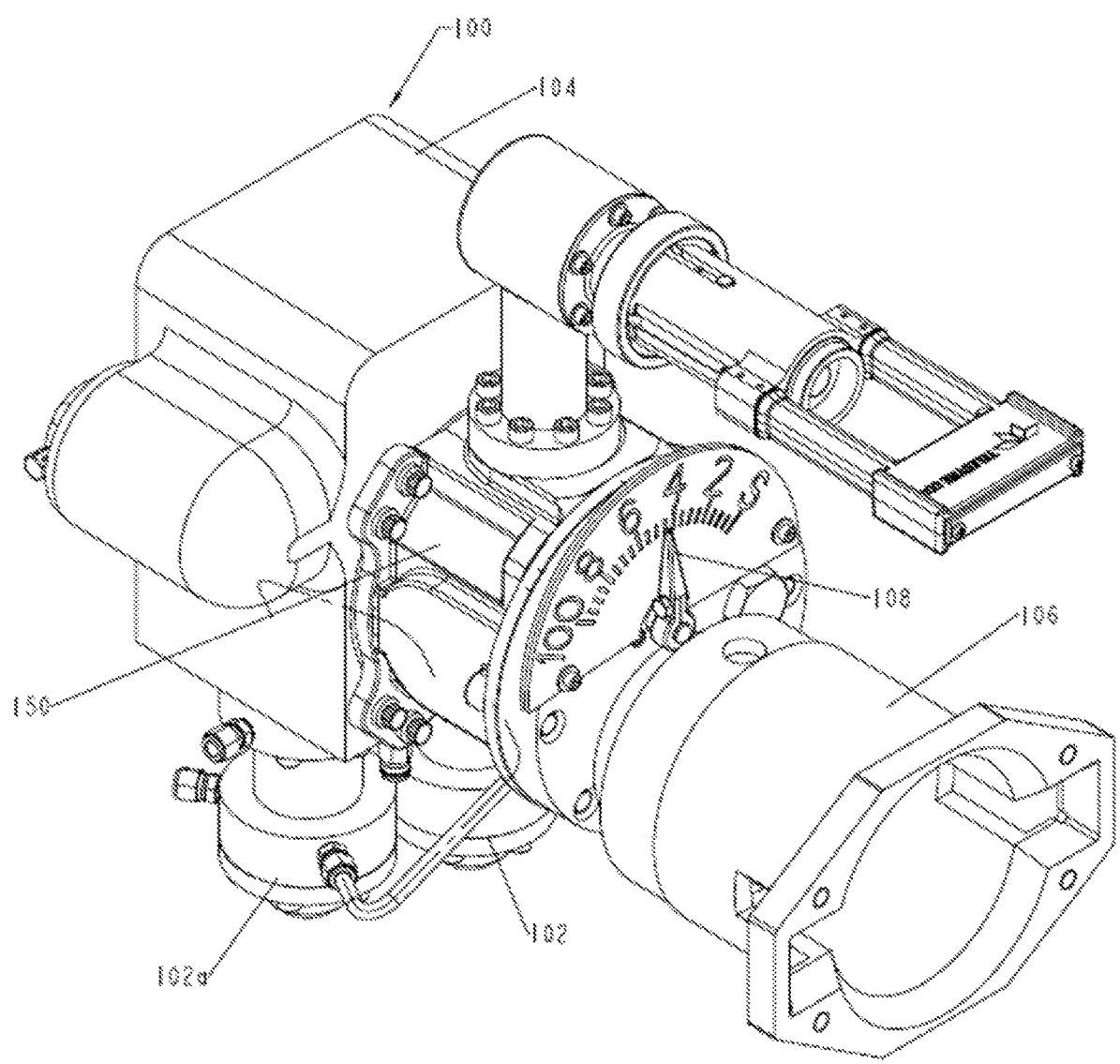
FIG. 1 is a top perspective view of a Master Flo prior art subsea rotary stepping actuator shown separate from a choke valve.

A rotary stepping actuator 200 and its components are described herein with reference to FIGS. 6-16, adapted for connection to a Master Flo prior art subsea choke valve of an external sleeve internal cage design. For ease of understanding the environment and applications for the rotary stepping actuator 200 of this invention, examples of Master Flo prior art choke assemblies are shown in FIGS. 1-5, and are described below. In the embodiment of FIGS. 6-16, the rotary stepping actuator 200 functions to convert linear movement from one or more hydraulic cylinder pistons into a rotational stepping motion in fixed predetermined angular increments, or in fractions of the predetermined angular increment, to the stem nut, which in turn imparts translational or axial movement of a threaded valve stem to move the throttling sleeve (flow collar) of a flow trim between open and closed positions. However, the rotary stepping actuator 200 has broader application, and may be used to impart rotational stepping motion in a fixed angular increments, or in fractions of the predetermined angular increments, to a threaded stem nut to actuate other types of choke valves, valves or other devices.

Before describing the components of the rotary stepping actuator 200, the components of a Master Flo prior art surface choke valve (FIG. 4) and a Master Flo prior art subsea choke valve (FIG. 5), will be generally described, with like parts being labelled with the same reference numerals in other of the Figures herein.

Figure 4:
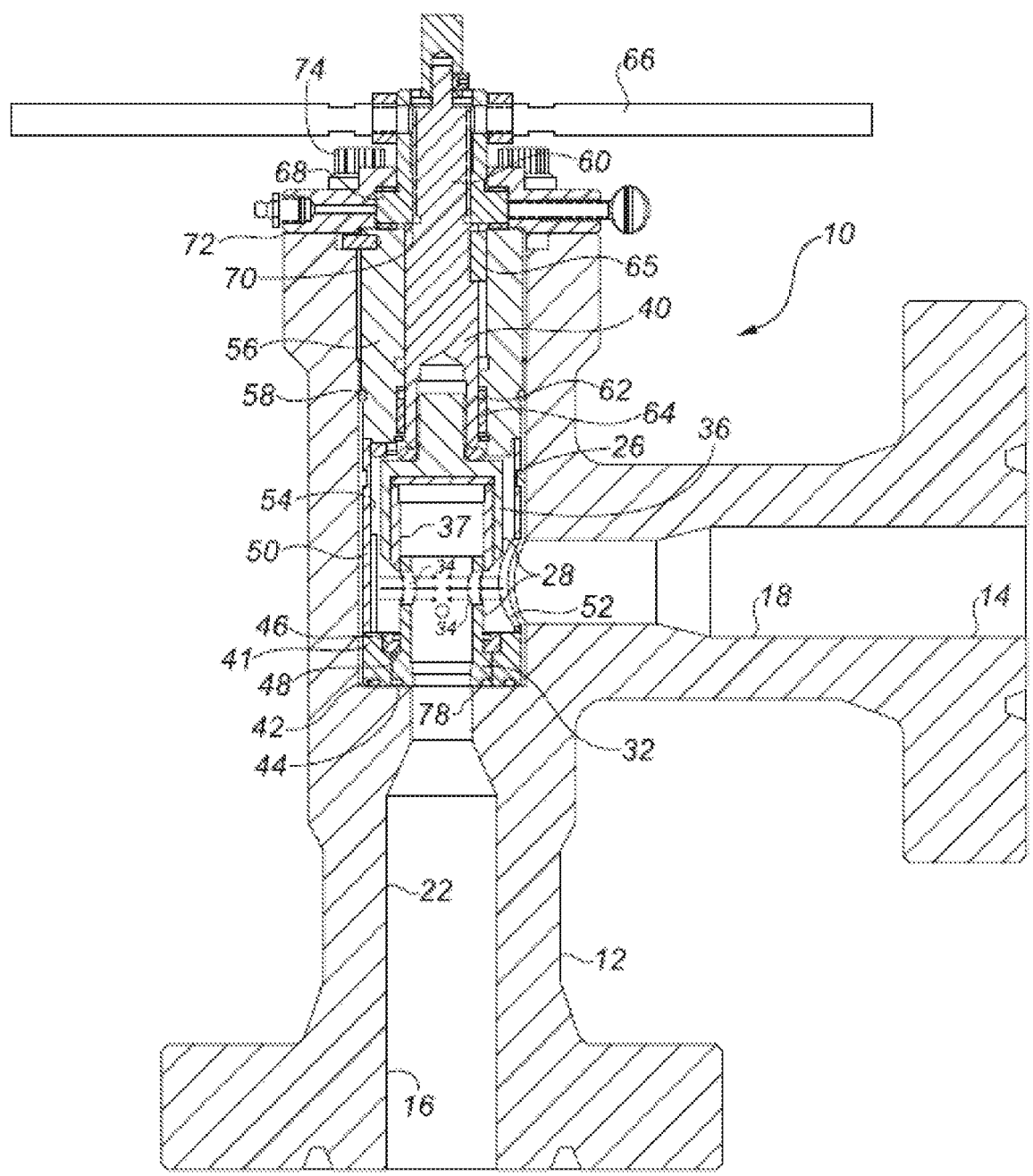
FIGS. 4 and 5 are embodiments of Master Flo prior art surface and subsea choke valves respectively to illustrate the common choke valve components, and to illustrate examples of valve devices which can be adapted for actuation by the rotary stepping actuator of the present invention.
Figure 5:
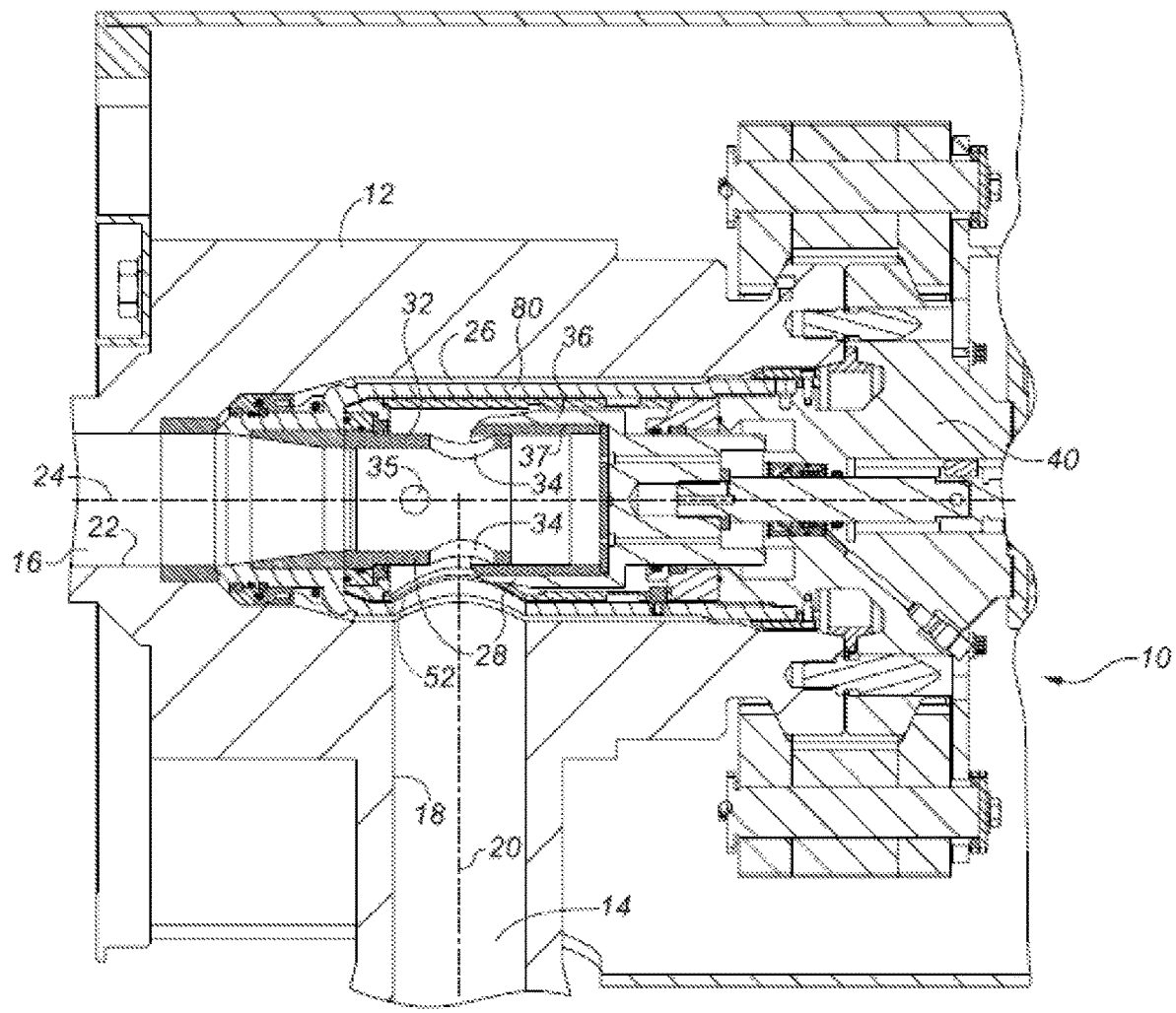

FIGS. 4 and 5 show exemplary surface and subsea choke valves of the prior art which might be adapted for actuation with the rotary stepping actuator of the present invention.

However, the invention is not limited to application with these choke valves. The rotary stepping actuator has broad application to other valves, particularly for valves having an externally rising threaded valve stem and a need for linear stepwise actuation of the flow trim.

The flow trim and cage components of the valves shown in FIGS. 4 and 5 may be altered from that shown in the Figures. For example, the cage component may be adapted for use with other known external sleeve inner cage valves, for example cage valves in which the cage component is fitted at, or into, the outlet of the valve, for example by threading. The cage component may be adapted for use in external sleeve inner cage valves in which the cage component is multi-ported, with a plurality of flow ports (same or differently sized) arranged circumferentially around the ported portion of the cage component. In the description which follows, the cage component is described as being adapted for flow trim of the type shown in FIGS. 4 and 5, however, this description is illustrative only, and the claims which follow should not be interpreted as being limited to these valves.

Figure 2:
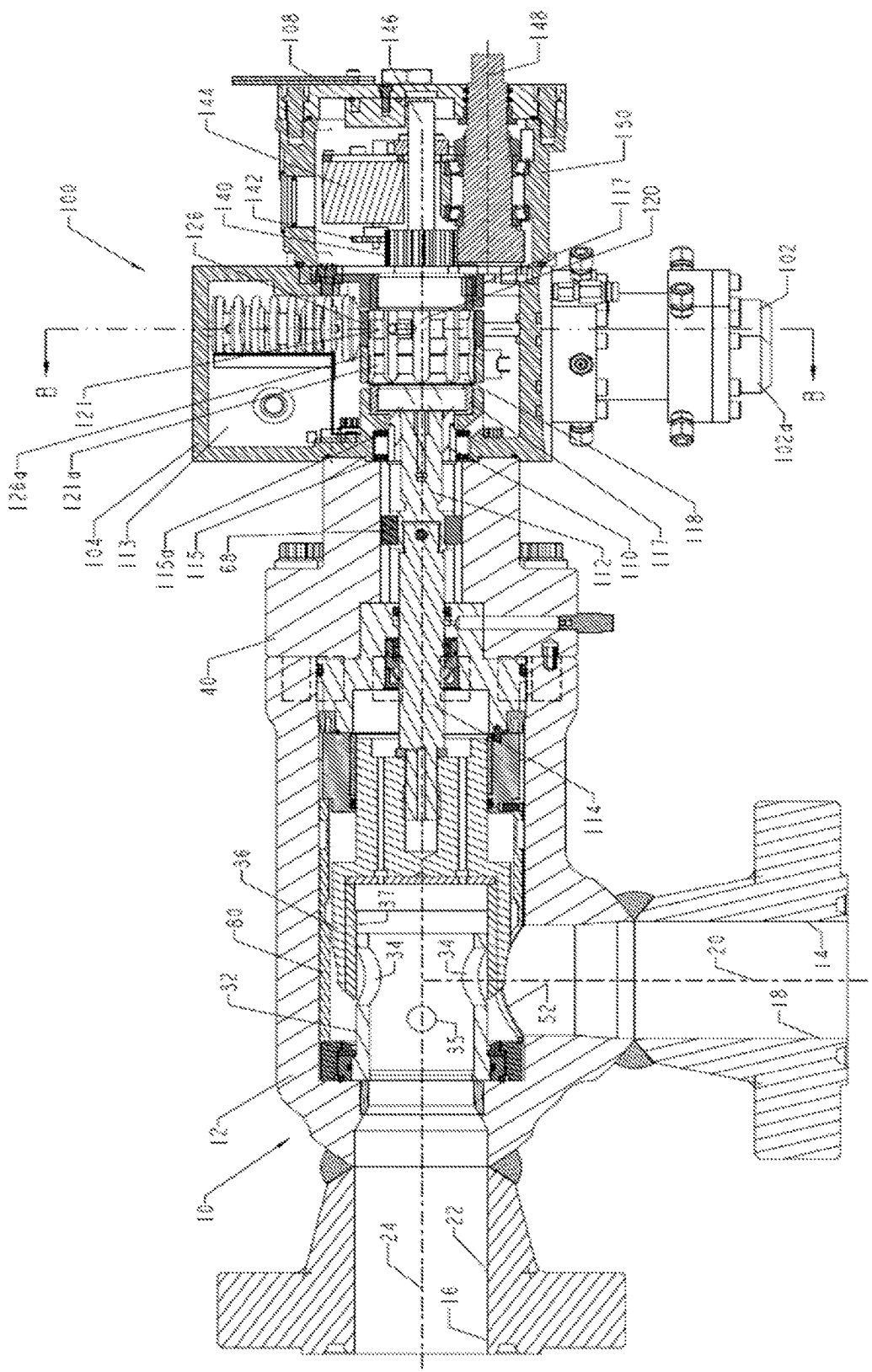
FIG. 2 is a side sectional view taken along line A-A of FIG. 3 showing the subsea rotary stepping actuator of FIG. 1 connected to a stem/bonnet assembly of a Master Flo prior art choke valve, and with the drive shaft component not in section to show the axially aligned slots.

Each of FIGS. 4 and 5 show a choke valve which is of a external sleeve inner cage valve type. The valve is generally shown at 10, and includes a hollow valve body 12, a body side inlet 14 and a body outlet 16. The hollow valve body 12 forms a bore which extends there through providing side inlet bore 18 having an inlet bore axis 20 (see FIG. 5, center axis), a bottom outlet bore 22 having outlet bore axis 24 (see FIG. 5, center axis). The side inlet bore 18 and the bottom outlet bore 22 intersect at right angles (i.e., are generally T-shaped), forming a main bore 26 at the intersection. The main bore 26 is an extension of the bottom outlet bore 22, but also communicates with the side inlet bore 18. FIG. 2 shows a somewhat similar valve designed for subsea applications, with a removable insert assembly for remote controlled maintenance. While the above main valve parts are common to both valves in FIGS. 1 and 2, the description below is adapted to describe the valve of FIG. 1 in greater detail.

Flow trim components 28 are shown to be located in the main bore 26, including a stationary cage component 32 (herein termed cage) which is tubular and substantially open-ended, and an external throttling cylindrical sleeve (herein also termed flow collar) 36 adapted to slide along the outer side wall of the upstream end of the cage 32. The flow collar 36 is closed at its upper end (upstream end) and typically includes a steel exterior into which is press fit an inner liner 37 formed of hard, erosion resistant material, such as tungsten carbide. The cage 32 has a side wall which forms an internal bore that communicates with, and is substantially aligned with, the outlet bore 22. The side wall of the cage 32 also forms one or more flow ports, shown as being arranged as at least a pair of diametrically opposed main flow ports 34. Alternatively, as noted above, a plurality of circumferentially spaced flow ports may be present. The cage side wall may also be formed with at least a pair of diametrically opposed smaller, secondary flow ports 35. The secondary flow ports 35 have a smaller diameter than that of the main flow ports 34, and are positioned with their axis (i.e., an axis through the midpoint of the ports) rotated or offset by 90° from the axis of the main flow ports 34. The secondary ports 35 are positioned closer to the body outlet 16 than are the main flow ports 34. The main flow ports 34, being larger in diameter, collectively accommodate a majority (i.e., more than 50%) of the fluid flow from the inlet 16. Preferably, the main flow ports 34 are arranged as diametrically opposed pairs, such as 1, 2 or 3 pairs. The main flow ports 34 may be circumferentially spaced and circumferentially aligned on the cage 32 (i.e., the midpoints of the ports 34 are equally spaced in a circle around the circumference of the cage 32). As well, the main flow ports may be located to overlap the intersection of the center axes of the body side inlet 14 and the body outlet 16. As well, at least one pair of the one or more pairs of the diametrically opposed main flow ports may be arranged such that a line through a midpoint of the diametrically opposed main flow ports is parallel to a center axis of the inlet bore.

The flow collar 36 is connected to a stem/bonnet assembly 40 for closing the upper end of the valve body 12 (i.e., the end opposite the outlet 16) and for advancing or withdrawing the flow collar 36 to slide across the ports 34, 35 to close them or open them as described below. The flow trim components 28 are preferably made of an erosion resistant hard material such as tungsten carbide. In FIGS. 4 and 5, the cage 32 is shown as known in the prior art, for example a unitary item formed from tungsten carbide material.

The main bore 26 is formed to be larger in diameter than the outlet bore 22 in order to house, seat and seal the flow trim components 28 therein. A cylindrical seat 41 is positioned at the lower end of the main bore 26, and sealed to the valve body 12 in the main bore 26 with seat seal 42. The stationary cage 32 is held at its lower end within the inner diameter of the seat 41, and carries a cage seal 44 at its lower end to seal to the valve body 12. A seat insert member 46 is seated in the inside diameter of seat 41. This seat insert member 46 is preferably formed of erosion resistant material such as tungsten carbide and serves multiple purposes. The seat insert member 46 protrudes inwardly to the cage 32 above a widened retaining shoulder 48 of the cage 32, thereby retaining the cage 32 within the main bore 26. As well, the seat insert member 46 forms a seat for the flow collar 36, when the flow collar 36 is in the fully closed position covering the main and secondary flow ports 34, 35. A tubular retaining sleeve 50 is preferably positioned in the main bore 26 between the seat 41 and the bonnet 56. The flow trim 28 is positioned within the retaining sleeve 50. The retaining sleeve 50 extends transversely over the inlet bore 18, and has its bore 54 aligned with the outlet axis 24. The sleeve 50 includes at least one sleeve side port 52 into the sleeve bore 54, the side port 52 preferably being aligned with the inlet bore. In alternate embodiments, the sleeve side port 52 and main flow ports 34 may be offset relative to the inlet bore 18 for fracture prevention from debris moving down the inlet, as is described in U.S. Pat. No. 7,426,938 to Bohaychuk et al. In still further embodiments, the tubular retaining sleeve 50 may be omitted and the cage component may be held at or within the outlet bore 22, for example by threading.

The stem/bonnet assembly 40 is shown to include a stationary bonnet member 56 extending into the main bore 26, and carrying bonnet-body seal 58. Housed within the bonnet member 56 is an externally threaded stem member (or stem assembly) 60. The stem 60 and bonnet 56 are sealed though stem-bonnet seal 62 and stem bushing 64. The stem 60 is designed for axial movement, the result of rotational movement of the upper stem nut 68, whose internal threads cooperatively engage the externally threaded section of the stem 60, being initiated for example, by rotating the handle 66 at its upper end. The stem 60 is connected and sealed to the flow collar 36 at its lower end in a known manner to impart translational movement (termed axial movement) to the flow collar 36 for opening and closing the valve 10. Key member 65, positioned between the stem 60 and the bonnet 56, prevents rotational movement of stem 60 within the bonnet 56, while permitting translational movement to be imparted to the flow collar 36. The upward movement of the stem 60, and thus the flow collar 36, is limited when stem shoulder 70 hits the stem nut 68. Alternate stem stop mechanisms may be used to limit upward stem movement to prevent fully uncovering the main flow ports 34, as described in U.S. Pat. No. 8,371,333 issued Feb. 12, 2013 to Bohaychuk. The bonnet 56 is connected at its upper end to bonnet flange 72, which retains the bonnet 56 and closes the upper end of the main bore 26. The flange 72 is bolted to the valve body 12 through cap screws 74. Alternate mechanisms for closing the valve body 12, and for actuating the flow collar 36 for translational movement are well known in the art, such as hydraulic actuators. These actuators might be replaced with the rotary stepping actuator 200 of the present invention, as set out more fully below.

It should be understood that the stem bonnet assembly 40 might include other components for mounting to the rotary stepping actuator of the present invention, such as mounting plates or yokes, as is known in the art. Thus, as described herein and in the claims, the connections or couplings between body members, housings or other components may be direct, or may be indirect through other art known components.

As shown in FIG. 5, the flow trim and stem/bonnet assembly 40 may be positioned as an insert assembly wherein the flow trim 28 is held within a removable tubular cartridge 80 (in place of tubular retaining sleeve 50 of FIG. 4) in the main bore for subsea applications. Further details are shown in the prior art including U.S. Pat. No. 7,426,938 to Bohaychuk et al. or U.S. Pat. No. 4,540,022 to Cove. Hereagain, the actuation of these subsea prior art choke valves might be replaced with the rotary stepping actuator of the present invention, as set out more fully below.

Figure 3:
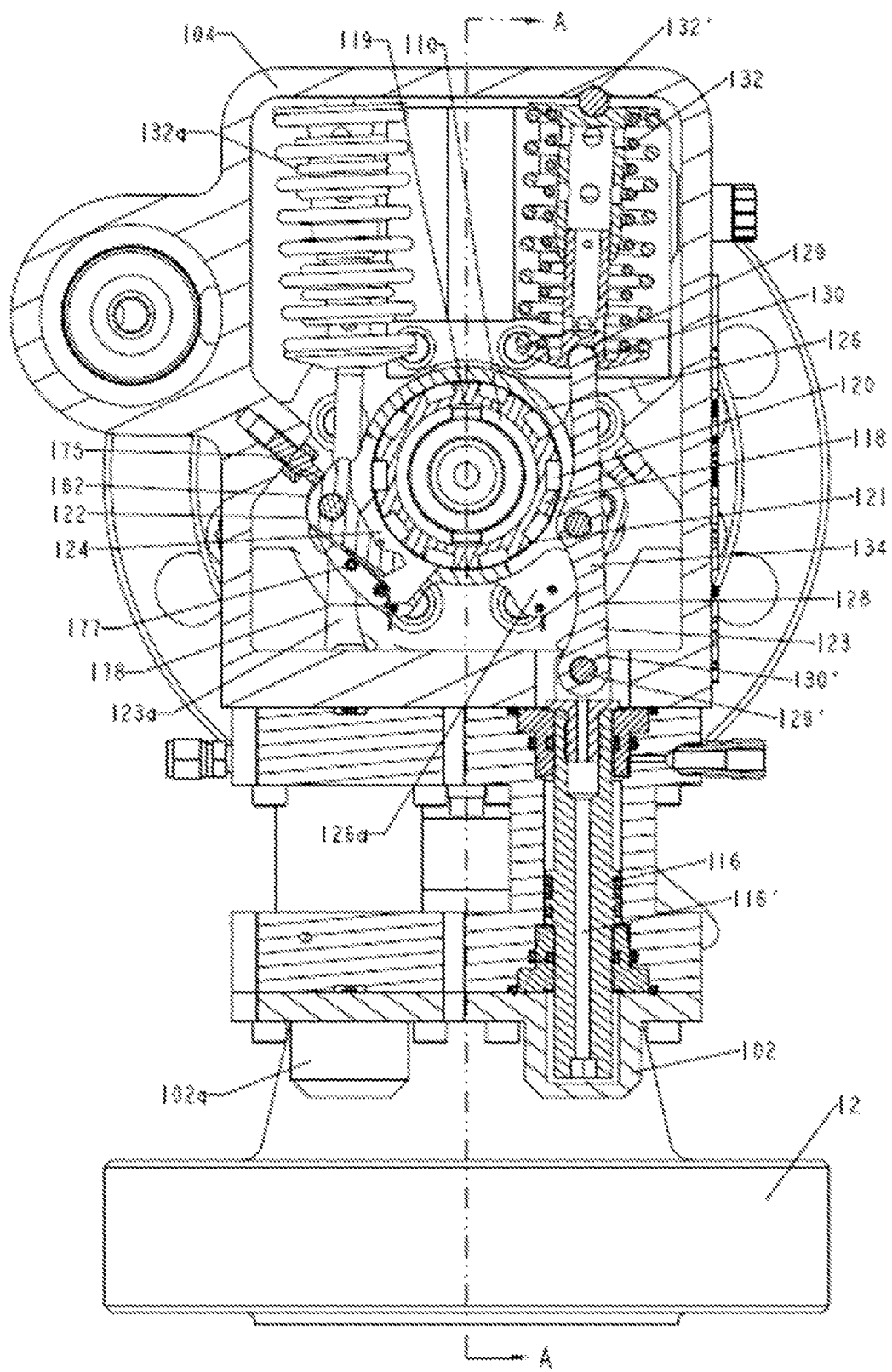
FIG. 3 is a sectional view taken along line B-B of FIG. 2 showing the actuator components for the rotary stepping actuator of FIGS. 1 and 2.

An embodiment of a Master Flo prior art subsea rotary stepping actuator will now be described with reference to FIGS. 1-3. For the most part, reference numerals from FIGS. 4 and 5 are used for the same or similar components in FIGS. 1-3. FIG. 1 shows the rotary stepping actuator 100 separate from the choke valve body and flow trim components and the stem/bonnet assembly. Two hydraulic cylinders 102, 102a are shown extending from the actuator housing 104 of the stepping actuator 100. The cylinders 102, 102a are used to impart rotational stepping motion to actuator components in pre-determined, fixed angular increments through to a stem nut 110 (see FIG. 2) in a clockwise or a counterclockwise direction. In one industry standard, the counterclockwise rotational motion of a drive stem 148 for an ROV overdrive is transferred to axial (translational) movement of the threaded valve stem 112 (see FIG. 2) to open the flow trim 28, while a clockwise rotational motion of the drive stem 148 is transferred to axial (translational) movement of the threaded valve stem 112 to close the flow trim 28. In the embodiment of FIGS. 1-3, one hydraulic cylinder 102a is used to rotate a drive shaft 118 clockwise for a valve opening operation and one hydraulic cylinder 102 is used to rotate the drive shaft 118 counterclockwise for a valve closing operation. However, in other embodiments, the directions can be reversed. As well, a single hydraulic cylinder might be used for both directions of actuation. Still alternatively, the hydraulic cylinders might be replaced with pneumatic cylinders.

In the embodiment of FIGS. 1-3, the cylinders 102, 102a impart rotational stepping motion through actuator components in the same pre-determined angular increments to the stem nut 110 to move the valve stem 112 the same axial distance in each of the closing and opening directions. FIG. 1 shows an ROV receptacle 106 connected to a top housing 150 which is in turn connected to the actuator housing 104. The ROV receptacle allows for attachment to the ROV. A position indicator 108 is shown with the top housing 150 to indicate the position of the flow trim components. For a subsea choke valve, the actuator housing is commonly filled with a fluid such as a dielectric oil. The stems of the pistons 116 may be hollow, and in fluid communication with the fluid in the actuator housing (best shown in FIG. 3). The cylinders 102, 102a are double acting cylinders in the FIGS. 1-3 to assist in balancing the pressure on both sides of the piston 116. However, single acting cylinders might also be used.

FIG. 2 is a sectional view, lengthwise, along the outlet axis 24 (along line A-A of FIG. 3) of an embodiment of a Master-Flo prior art subsea choke valve showing the actuator housing 104 of the rotary stepping actuator 100 connected to the stem/bonnet assembly 40 of a subsea choke valve 10. The actuator components (described below) of the rotary stepping actuator 100 are rotationally connected to the internally threaded stem nut 110, which in turn is connected to the externally threaded rising valve stem 112 of the choke flow trim 28. As above, this particular embodiment is adapted for a subsea wellhead. In subsea wellheads, maintenance cannot be performed manually. An unmanned ROV is used to approach the wellhead and carry out maintenance functions. In FIG. 2, the ROV receptacle 106 of FIG. 1 is removed to simplify the drawing. To aid in servicing subsea choke valves, the choke valve 10 has the internal components, including the flow trim 28, assembled into a modular sub-assembly (insert assembly) which is inserted into the choke valve body 12 and clamped into position. The particular embodiment shows the flow trim 28 of an external sleeve internal cage design, with an external tubular throttling sleeve (flow collar) 36 that slides over the internal ported tubular cage 32. The flow collar 36 acts to reduce or increase the area of the flow ports 34. The rotary stepping actuator 100 is shown configured to connect to the stem nut 110, and the threaded valve stem 112 is part of a multi-component stem assembly 114. Rotation of the valve stem 112 is prevented by key member 65 (as described above for FIG. 4), so the rotational movement of the stem nut 110 is transferred to axial, translational movement to bias the flow collar 36 back and forth along the external wall of the ported cage 32. The rate that fluid passes through the flow trim 28 is dependent on the relative position of the flow collar 36 on the cage 32 and the amount of port area that is revealed by the flow collar 36. The stem nut 110 and valve stem 112 extend into a stem entry port 115 of the actuator housing 104. The load of the stem nut 110 is supported by thrust bearings 115a at the stem entry port 115.

The connections of each of the valve body 12, the stem/bonnet assembly 40, the actuator housing 104 and the top housing 150 are all pressure containing connections as known in the art. In a subsea choke as shown in FIG. 2, the actuator housing 104 is filled with a fluid such as a dielectric oil. A pressure/volume compensation mechanism for this purpose is shown at 113.

FIG. 3 is a sectional view taken along line B-B of FIG. 2 showing the internal actuator components of the stepping actuator 100 to convert linear movement from hydraulic piston stems 116 into a rotational stepping motion in fixed, pre-determined angular increments to be imparted to the stem nut 110, to move the valve stem 112 axially and to move to move the flow collar 36 of the flow trim 28 between open and closed positions. In the prior art rotary stepping actuator 100 of FIGS. 1-3, the increments for stepping are identical in the counterclockwise (closing) and clockwise (opening) directions. For example, fixed angular increments of 36 degrees per step in each of the forward and reverse direction is a typical standard for subsea stepping actuators as shown in FIGS. 1-3. Depending on the threads of the valve stem 112 and the stem nut 110, each 36 degree angular increment, when transmitted to the threaded stem nut 110, typically results in a 0.017 inch axial, translational movement of valve stem 112 and the flow collar 36 along the internal cage 32. This increment of axial movement can be adjusted with the threads of the stem nut 110 and the valve stem 112.

In the stepping actuator 100 of FIGS. 1-3, the angular rotation to the stem nut 110 is accomplished using a slotted tubular drive shaft 118 which is supported for rotation in the actuator housing 104 by bushings 117. The drive shaft 118 is mounted concentrically around the stem nut 110 so as to be co-axially aligned with the stem nut 110. The drive shaft 118 is keyed to the stem nut 110 with one or more keys 119 so as to be rotatably coupled to the stem nut 110.

The slotted drive shaft 118 is shown to be formed with 10 equally spaced, outwardly opening, peripheral slots 120 extending axially along the rotational axis of the drive shaft 118. The slots 120 are matched in number, size and spacing, with the slot spacing being defined by a midpoint to midpoint slot spacing of adjacent slots. For example, in FIG. 2, the slot spacing of the 10 slots 120 around the periphery of the drive shaft 118 is 36°. As best seen in FIG. 2, the slots 120 are arranged in a first slotted circular drive path 121 and a second slotted circular drive path 121a around the periphery of the drive shaft 118, with the first and second drive paths 121, 121a being co-axially spaced from each other along the rotational axis of the drive shaft 118. The slots 120 in the first and second drive paths 121, 121a are co-axially and rotationally aligned with each other. As seen in FIG. 2, the slots 120 are continuous across the first and second drive paths 121, 121a such that the slot openings are co-axially and rotationally aligned in each drive path.

A first actuation assembly 123 and a second actuation assembly 123a are mounted in the actuator housing adjacent the first and second drive paths 121, 121a respectively. Each actuation assembly 123, 123a functions to move from a retracted position out of contact with the slots 120 through a forward (valve opening) or reverse (valve closing) actuation cycle, to releasably engage one of the slots 120 and to incrementally rotate the drive shaft 118 through a predetermined angular increment in a clockwise or counterclockwise direction, when moved through the forward or reverse actuation cycle respectively. In the embodiment of FIGS. 1-3, the first and second actuation assemblies 123, 123a include identical actuation components, except that the components for the reverse actuation cycle of the second drive path 121a are reversed by a 180° rotation. FIG. 3 is a sectional view through the first drive path 121 to show the components of the first actuation assembly 123. Some of the components for the second actuation assembly 123a are visible below the first actuation assembly 123 (into the page in FIG. 3), and these components are labelled with the same reference numerals, but with an added "a".

The first actuation assembly 123 is shown to include a drive collar 126, which is generally annular, and which is mounted co-axially with, and circularly around, the first drive path 121 for rotational counterclockwise and clockwise movement in a radial arc about the first drive path 121. A spring-biased ratchet pawl 122 is pivotally connected with the drive collar 126 to be pivotally movable between an engaged position within one of the slots 120 and a disengaged position released from the slot 120 with each counterclockwise and clockwise rotation of the drive collar 126. A connecting arm 128, oriented tangentially to the drive collar 126, is pivotally connected at its ends 130, 130' with a pivotal connection 129' to the piston stem 116 of the hydraulic cylinder 102 and with a ball and socket connection 129 to one or more compression springs 132. The compression spring 132 is also connected through a ball and socket connection 132' to the actuator housing 104. The connecting arm 128 has a central portion 134 between its ends 130, 130' which is pivotally connected to the drive collar 126. In this manner, extension of the piston stem 116 causes the connecting arm 128 to impart radial rotational movement to the drive collar 126 in a driven step in the counterclockwise direction to move the ratchet pawl into the engaged position with one of the slots 120 of the drive shaft 118. Retraction of the piston 116 with the compression springs 132 causes the connecting arm 128 to impart radial rotational movement to the drive collar 126 in a return step in an opposite clockwise direction to move the ratchet pawl 122 into the disengaged position released from the slot 120 and from the drive shaft 118.

The ratchet pawl 122 is pivotally mounted in an outwardly opening peripheral slot 124 formed in drive collar 126. The connecting arm 128 is pivotally connected at the middle portion 134 in the outwardly opening peripheral slot 124 of the drive collar 126. The ratchet pawl pivotal connection in drive collar peripheral slots 124 generally diametrically opposite the connecting arm pivotal connection in drive collar peripheral slots 124. The above description refers generally to the actuation components as visible in FIG. 2 for the counterclockwise rotational drive imparted to the drive shaft 118. As above, the same actuation components are used for the clockwise rotational drive imparted to the drive shaft 118 in the second drive path 121a, located axially below the section shown in FIG. 3, however the actuation components are 180 degrees reversed. For those actuation components of the clockwise rotational drive that are visible in FIGS. 2 and 3, like components are labelled with the same reference numerals, but with an added "a" after the reference numeral (for example compression springs 132a).

As set out above, the ratchet pawls 122 has an engaged position, relative to the drive shaft 118, in which the drive collar 126 is rotated and the pawl 122, engages a slot 120 of the drive shaft 118, with the spring bias operating on the pawl 122. In order to retain the pawl 122 in a disengaged position, i.e., out of engagement with the drive shaft 118, against the spring bias on the pawl, a pawl stop pin 175 is provided. In FIG. 3, the drive collar 126 is shown to be in a position between actuation cycles, with the pawl 122 in the disengaged position, with a pawl stop pin 175 connected to the actuator housing 104, and operative to contact a back face 162 of the ratchet pawl 122, rearwardly of the pawl pivotal connection, to hold the pawl 122 in the disengaged position. As the drive collar 126 is rotated during an actuation cycle, the pawl stop pin 175 no longer contacts the back face 162, and the spring bias of on the ratchet pawl 122 moves the ratchet pawl 122 into contact with the drive shaft.

In FIG. 2, the position indicator 108 is shown to be driven from the drive shaft 118 by gears 140, 142 on a gear box 144. A linear variable differential transformer (LVDT) 146 may be included to directly measure the position of the valve stem for accurate electrical feedback of the choke position. Also shown in FIG. 3 a drive stem 148 of an ROV override mechanism, is adapted to drive the drive shaft 118 during override operations. The components for the position indicator 108, the LVDT 146 and the ROV override mechanism are shown in FIG. 2 to include a top housing 150 connected to the actuator housing 104.

The actuation components including the drive shaft 118, the drive collar 126, the ratchet pawl 122 are typically formed from carbon steel, or other suitable materials for application in surface or subsea choke valves.

The double acting hydraulic cylinders 102, 102a for a subsea choke valve might use, for example a 3000 or 5000 PSIG hydraulic supply pressure. The hydraulic pressure is used to extend the pistons 116, and the spring force is used to retract. The hydraulic back pressure, caused by the hydraulic fluid head in a supply line (not shown), may be balanced by use of a cross-porting system that connects the vent side of one piston to the supply side of the other. This ensures that the return compression springs 132 function consistently and reliably and that the ratchet pawl 122 which is not engaged (i.e. the idle ratchet pawl) is completely disengaged from the drive shaft 118. The piston stems 116 extend on either side of the pistons, which allows for effective support and guidance of the pistons throughout their motion. As well, a port 116' drilled through the center of the piston stems 116 connects the fluid volume behind the stems 116 to that of the actuator housing 104, ensuring that there is no net change in the actuator housing volume due to the stroking of the pistons.

Based partly on this description from prior art FIGS. 1-5, an embodiment of a stepping actuator 200 of the present invention is described in with reference to FIGS. 6-16. For valve and flow trim components similar to those of FIGS. 4, 5, like reference numerals are used. For stepping actuator components which are the same or similar to that described above for FIGS. 1-3, little additional description is needed, but the reference numerals for most of the like features are increased by 100 in FIGS. 6-16.

Figure 6:
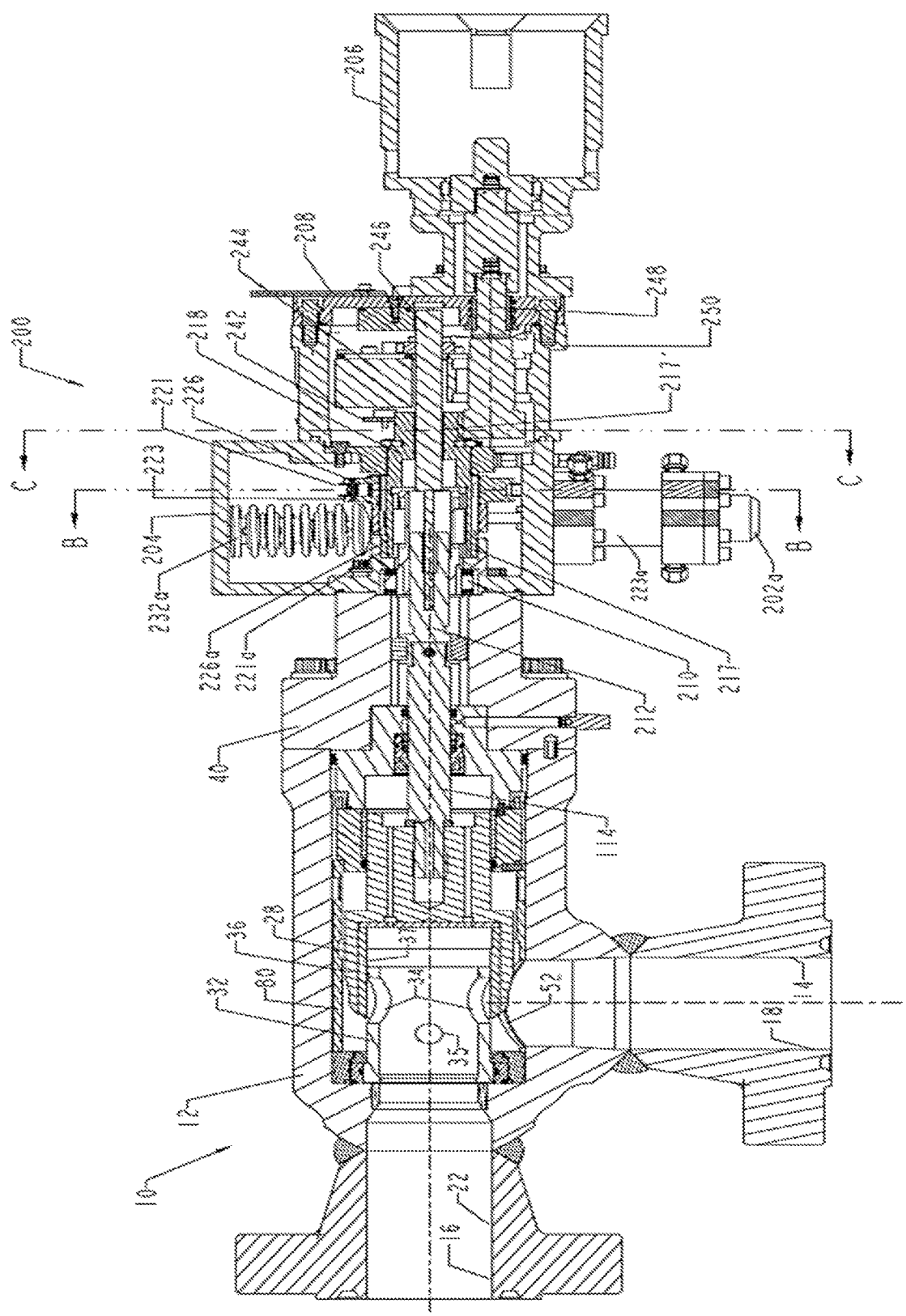
FIG. 6 is a side sectional view of an embodiment of a subsea choke valve according to the present invention, in which the stem/bonnet assembly of the choke valve is connected to an embodiment of a hydraulically driven rotary stepping actuator of the present invention, and taken along line A-A of FIG. 7.
Figure 7:
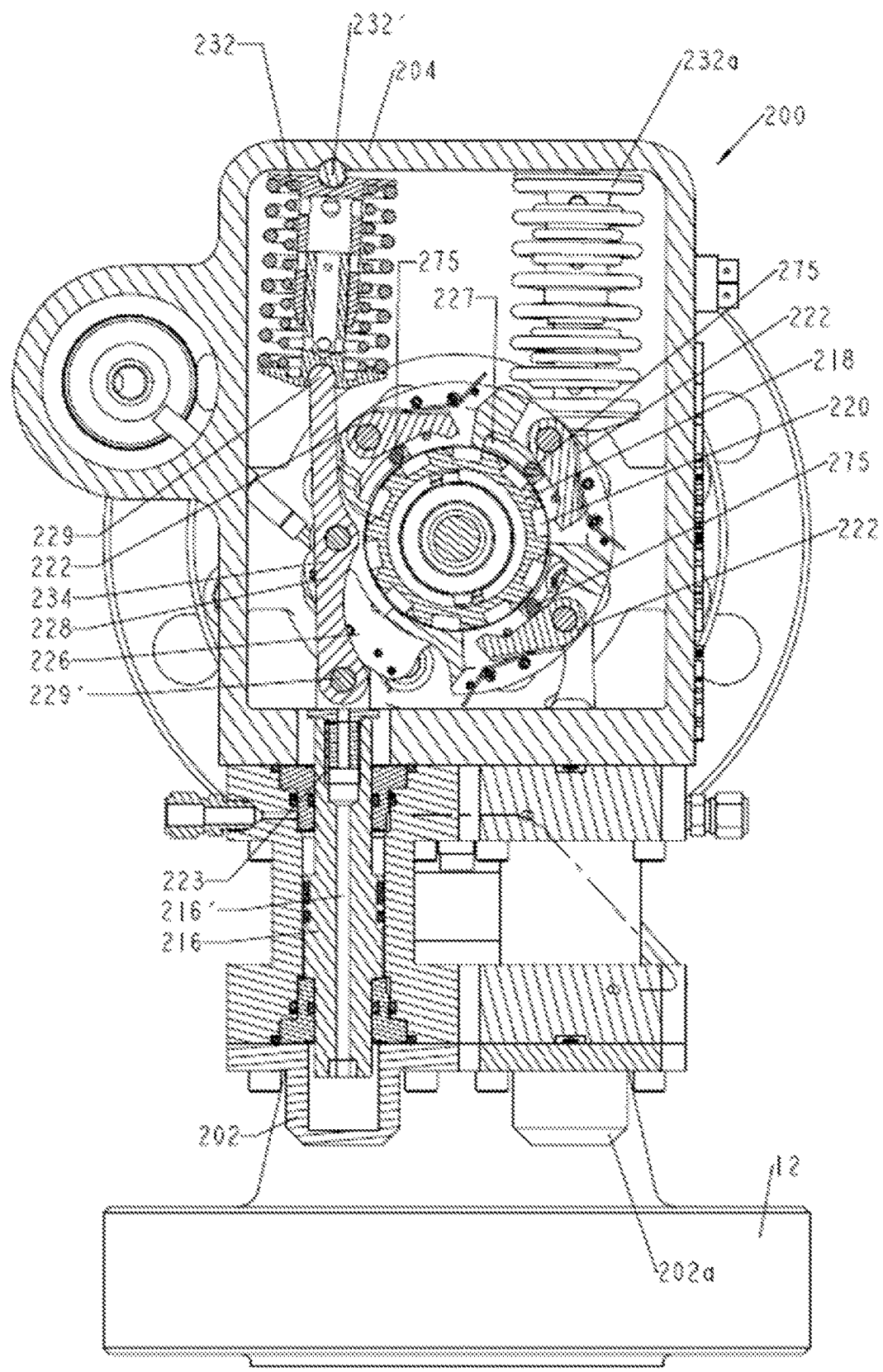
FIG. 7 is sectional view taken along line B-B of FIG. 6 showing the actuator components of the rotary stepping actuator of FIG. 6, and illustrating the plurality of ratchet pawls pivotally mounted in a drive collar for the forward actuation cycle to open the flow trim in partial forward steps.

In the embodiment of the stepping actuator 200 shown in FIGS. 6-16, a plurality of forward ratchet pawls 222 are shown for the first drive path 221 and the first actuation assembly 223 to provide the forward actuation cycle for the opening operation of the valve, while a single reverse ratchet pawl (not shown in FIGS. 6-15, but identical to ratchet pawl 122 in FIG. 3) is used for the second drive path 221a, and second actuation assembly 223a to provide the reverse actuation cycles for the closing operation of the valve. As shown in FIG. 7, the first actuation assembly 223 is actuated by hydraulic cylinder 202, with piston stem 216, piston port 216' and connecting arm 228, in a manner similar to that described above for FIG. 3. Since the second drive path 221a and the second actuation assembly 223a are not changed, except to accommodate minor size changes for the multiple pawls of the first actuation assembly 223, the description provided above for FIG. 3 provides adequate details of the second actuation assembly 223a and components, and the like components of the second actuation assembly, such as the reverse ratchet pawl 122, drive collar 126 etc., which are referred to herein below for the second actuation assembly 223a.

The plurality of forward ratchet pawls 222 in the forward actuation cycles provide finer control over the angular increments for each of the forward steps in the valve opening operation. However, this finer control is provided without modifying the drive shaft component 218, such that the number, size and spacing of the slots 220 in each of the first and second drive paths 221, 221a are matched. This ensures adequate strength in the drive shaft, and offers simplicity of operation for each of the forward and reverse actuation cycles.

Figure 8:
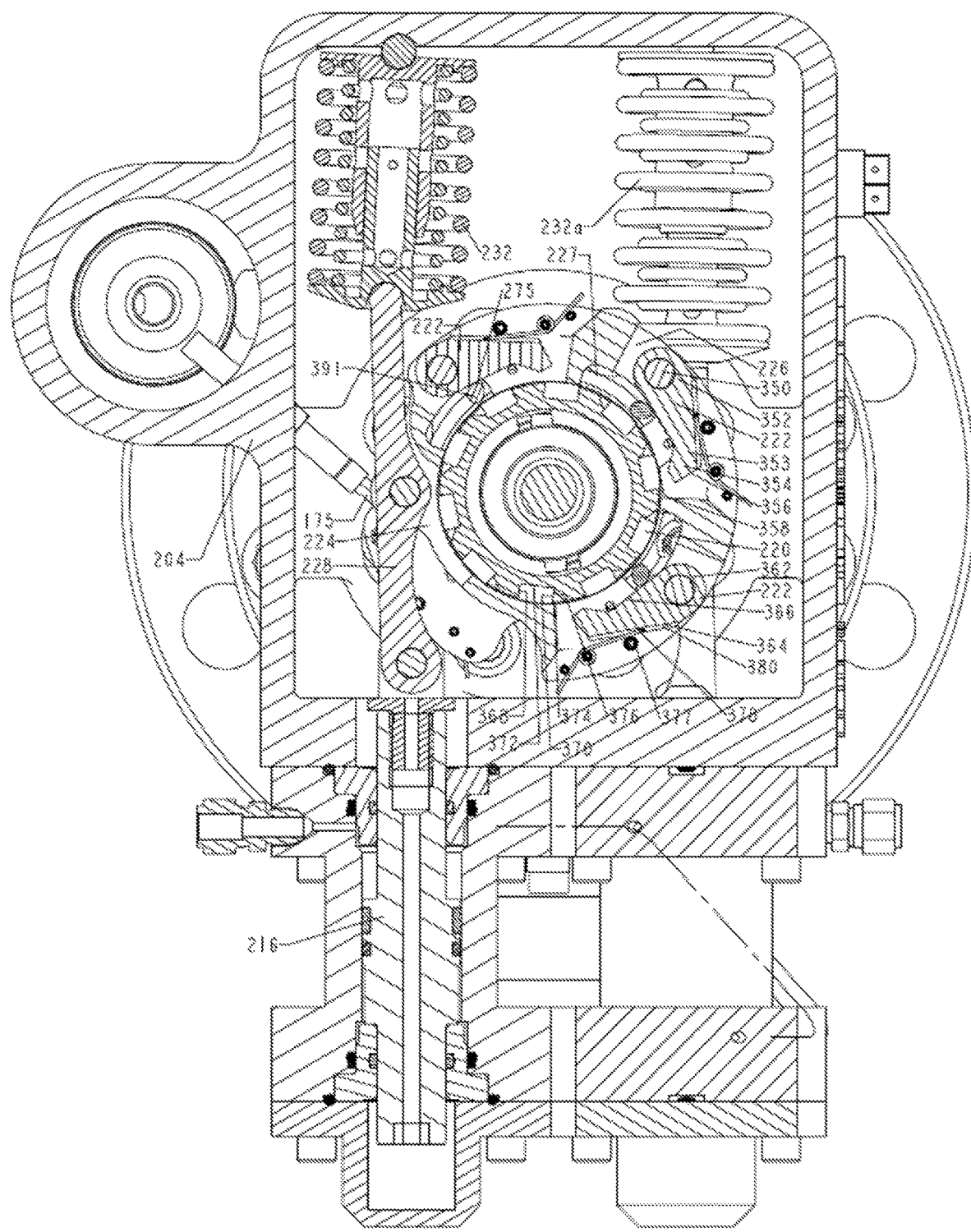
FIG. 8 is an enlarged sectional view of the actuator components of FIG. 7, showing the drive collar, three ratchet pawls, a connecting arm to the hydraulic piston, a slotted drive shaft, and a pawl stop associated with each forward ratchet pawl to hold the pawls in a disengaged position from the drive shaft when the drive collar is between actuation cycles and the piston is fully retracted.
Figure 10:
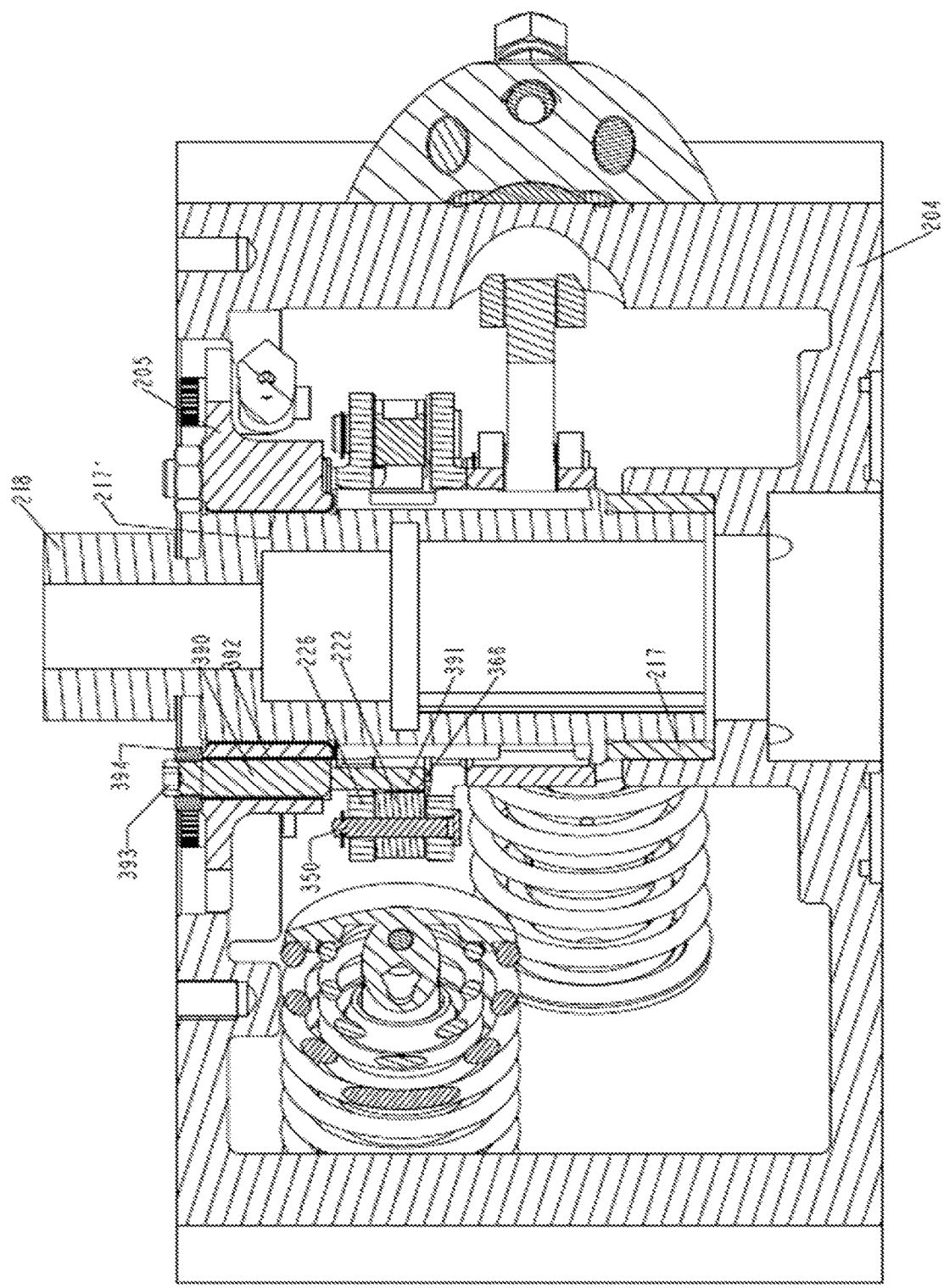
FIG. 10 is a sectional view taken along line D-D of FIG. 9, illustrating the pawl stop connection in the actuator housing for one of the forward ratchet pawls.

The tubular drive shaft component 218 is shown in FIGS. 6-8 to be supported for rotation in the actuator housing 204 and coupled to the stem nut 210 generally as described for FIGS. 2 and 3. A bushing 217 at one end of the drive shaft 218, and an actuator coating 217' at the other end of the drive shaft 218 to support the drive shaft in the actuator housing 204 is best seen in FIG. 10. The slots 220 formed at a periphery of the drive shaft 218 in the first slotted circular drive path 221 are matched in number, size and spacing to the slots in the second circular drive path 221a. Thus the drive shaft 218 is similar to the drive shaft 118 described above for FIGS. 2 and 3. While the slots are shown in FIGS. 7-8 to be generally rectangular when viewed in a cross section perpendicular to the rotational axis of the drive shaft 218, they may have a different shape, for example as the spaces between angled teeth similar to that of a ratchet wheel. The number of slots 220 may be varied as desired for the particular application of the stepping actuator 200. For a choke valve, for example, the number of slots might be between 5 and 15, depending on the predetermined angular increment that is desired for each full step of the actuating movement.

As used herein, and in the claims a "full step" refers to the full predetermined angular increment for rotation of the drive shaft, as set by the slot spacing of the drive shaft, and a "partial step" refers to the fraction of the predetermined angular increment as set by the number of ratchet pawls in the plurality of pawls used in one or both of the first and second drive paths. In FIGS. 7-8, the number of slots 220 is shown as 10, and the number for forward ratchet pawls 222 is three, and the partial steps, as set by the number of pawls is one third of the predetermined angular increment.

The first actuation assembly 223 is shown in FIGS. 7-8, for the forward steps of the valve in order to move the flow trim in the opening direction. As shown, the first actuation assembly 223 includes the plurality of forward ratchet pawls 222. The pre-determined angular increments imparted to the drive shaft 218 for a full step in each of the rotational directions of the forward and reverse actuation cycles, as set by the slot spacing, is 36° for 10 equally spaced slots. However, the angular increment actually imparted to the drive shaft 218 for each of the forward steps is the fraction of the predetermined angular increment, as set by the number of forward ratchet pawls 222. Thus, for the three forward pawls 222 shown in FIGS. 7-8, each forward step is one third of the predetermined angular increment, i.e., about 12°. The angular increment imparted to the drive shaft 218 for the full reverse step, i.e. a reverse step in a direction opposite to the forward step, is the full predetermined angular increment, as driven by a single reverse ratchet pawl, i.e., 36°. While in some embodiments the second actuation assembly 223a may be provided with a plurality of reverse ratchet pawls, similarly to the first actuation assembly 223, it is generally preferred to provide full reverse steps on the closing operation of the valve, so a single reverse ratchet pawl 122 is described in this embodiment (with associated components as shown in FIG. 3).

It should be understood that, due to the fractional stepping of the drive shaft in at least one direction, the first step taken in a direction counter to the direction of the immediately preceding step (i.e., a first counter step), may be less than a full step of the predetermined angular increment. Thus, after a forward partial step of 12° in the forward direction, a reverse step may be a one third (12°), two third (24°) or a full 36° increment, depending on the position of the drive shaft 218 after the previous forward step. However, it will be evident that the provision of the plurality of pawls in one or both of the forward and reverse stepping directions allows the flow trim 28 to be forward stepped or reverse stepped by a partial step in the forward and/or reverse steps for finer control over the position of the flow trim 28 in any partially opened or partially closed position. Thus, in the claims, reference to full step refers to the full step set by the slot spacing, and partial step refers to the partial step set by the fraction of the number of pawls, even though, due to the position of the drive shaft, the first counter step may be less than the full or partial step. During these first counter steps, the forward ratchet pawl 222, or the reverse ratchet pawl 122, remains out of engagement with the slot 220 or 120, and instead engages the periphery of the drive shaft 218 to delay engaging the slot 220 or 120 by a set fraction, or a multiple of the set fraction of the angular increment set by the slot spacing. This delay in engaging the slot 220 or 120, resulting from the plurality of pawls, is only for the first counter step, such that the next step in the same direction is the full step, or the partial step, depending on the direction of the actuation cycle.

FIG. 8 shows the forward ratchet pawls 222 and the slots 220 of the first drive path 221 in greater detail. Each forward ratchet pawl 222 is shown with the pivotal connection 350 to the forward drive collar 226 rearwardly of a central portion 352 of the forward pawl 222. A front portion 353 of the forward pawl 222, forward of the pivot connection 350, forms a notched portion 354 sized to fit into one of the slots 220 of the drive shaft 218. The notched portion 354 has a front drive face 356 and an opposed rear face 358. The central portion 352 of the pawl 222 is also shown to have a top surface 364 facing opposite the drive shaft 218 and a bottom surface 366 facing toward the drive shaft 218. The pivotal connection 350 is shown to be positioned off centre in the forward pawl 222, more proximate the back portion 362, similarly to that for the pawl 122 of FIG. 3.

Figure 16:
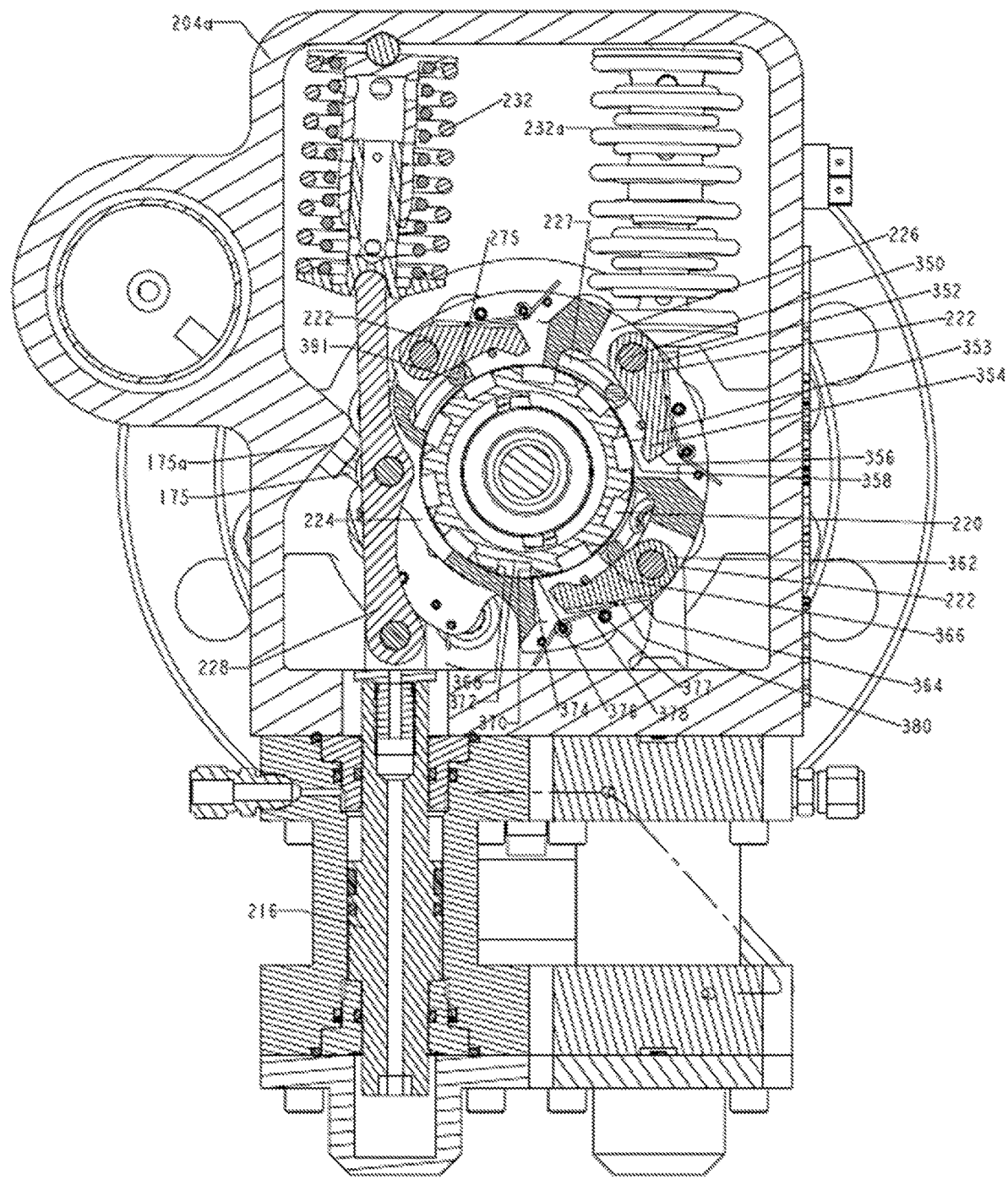
FIG. 16 is a sectional view similar to that of FIG. 8, but showing the actuator components within a production actuator housing, rather than in the actuator housing for test purposes shown in FIG. 8.

While not shown in the FIGS. 6-16, the reverse ratchet pawl is similarly shaped as described for the forward ratchet pawl 222, but is pivotally connected to the reverse drive collar 126, generally as shown and described above for FIG. 3 for reverse pawl 122 and drive collar 126. As shown in FIG. 3, the reverse ratchet pawl 122 differs from the forward ratchet pawls 222, in that the reverse ratchet pawl 122 has a back portion rearward of the pivotal connection 150 formed with a back face 162 for contact with the pawl stop pin 175, as described above. FIG. 8 shows the pawl stop pin 175 within an actuator housing 204 for testing purposes, with the pawl stop pin 175 being threaded through the actuator housing 204. FIG. 16 is included to show the details of the stepping actuator 200 in a production actuator housing 204a, in which the pawl stop pin 175 is shown with the pawl stop pin landing 175a.

Each of the slots 220, when viewed in the cross section of FIGS. 7-8 (perpendicular to the rotational axis of the drive shaft 218), is generally rectangular in cross section, with a front wall 368, a rear wall 370 and a bottom connecting wall 372. Slots 120 for the reverse actuation cycle of FIG. 3 are similarly shaped. During the driven step of the drive collar 226, when the pawl 222 is engaged in the slot 220, the front wall 368 of the slot is engaged with full contact with the front drive face 356 of the ratchet pawl 222 to impart the stepwise rotational movement to the drive shaft 218. During the return step of the drive collar 226, an outer lip 374 of the rear wall 370 of the slot 220 contacts the rear face 358 of the ratchet pawl 222 to move the ratchet pawl 222 released from the slot 220 so that no movement is imparted to the drive shaft 218. To further assist in full release of the ratchet pawl 222 from the slot 220, the outer lip 374 of the rear wall 370 of the slot 220 has a cut away portion 376. As well, the bottom portion 366 of the pawl 222 may be tapered toward the slot 220 to assist in releasing from the slot 220.

The drive collar 226 has a pawl limit pin 377 located at the periphery of the drive collar 226 parallel to the axis of rotation of the drive collar 226 to limit pivotal movement of the pawl 222 in the disengaged position. To spring bias the ratchet pawl 222 into engagement with the slot 220, a torsional spring 378 is mounted at the periphery of the drive collar 226 adapted to press against the top surface 364 of the pawl 222. A groove 380 is formed along the top surface 364 of the pawl 222 to hold the spring in place against the top surface 364 during the travel of the pawl 222. While the driven and return steps are described above for the first drive path 321, drive collar 226, slot 220, and pawl 222 components, the details for the second drive path 221a are similar, except for a single reverse pawl 122. For the reverse pawl 122, as shown in FIG. 3, a pawl limit pin 177 and spring 178 are provided, as described above for the forward pawl 222.

As shown in FIGS. 7-8, each of the plurality of forward ratchet pawls 222 are circumferentially spaced, with the angular spacing D between the pivotal centres 350 of the ratchet pawls 222 being adapted to ensure that only one of the ratchet pawls is engaged in a slot 220 while the remaining ratchet pawls 222 remain disengaged. In general, the spacing of the forward ratchet pawls, that is the angle D formed between the pivotal connection of the ratchet pawl to the drive collar 226, is shown schematically in FIG. 15, and is defined by the equation:

$$D=360*X/P*S,$$

wherein,
D is the angular spacing of the ratchet pawls,
X is a positive integer,
P is the number of ratchet pawls in the plurality of ratchet pawls, and
S is the number of openings or slots,
provided that D is not a multiple of 360/S.

For the three forward ratchet pawls shown in FIGS. 7-8, and with the number of slots being 10, the angular spacing D of the pawls is 12°, or a multiple as set by the integer X. The embodiment of FIGS. 7-8 shows a pawl spacing of 84°, using X as 7, which provides sufficient space between the pawls for their connections and functioning.

As set out above, each of the forward and reverse ratchet pawls 222, 122 has an engaged position, relative to the drive shaft 218, in which the drive collar 226, 126 is rotated and one of the pawls 222, 122 engages a slot 220 of the drive shaft 218, with the spring bias operating on the pawl 222. In order to retain the remaining pawls 222 in a disengaged position, i.e., our of engagement with the drive shaft 218 against the spring bias on the pawl 222, 122, pawl stops 275 are provided. In each of FIGS. 3 and 8, the drive collar 226, 126 is shown to be in a position between actuation cycles, with the pawls 222, 122 in the disengaged position, with a pawl stop 275 connected to the actuator housing 204, and operative to contact a surface of the ratchet pawl 222, 122 to hold the pawl in the disengaged position against the spring bias. For the reverse pawl 122, as described above for FIG. 3, a pawl stop pin 175 is mounted in the actuator housing 104 so as to contact the back face 162 of the pawl 122 to hold the pawl 122 in the disengaged position against the spring bias of spring 178. As the drive collar 126 is rotated during an actuation cycle, the pawl stop pin 175 no longer contacts the back face 162, and the spring bias of on the ratchet pawl 122 moves the ratchet pawl 122 into contact with the drive shaft. While a similar pawl stop pin may be used to hold the forward ratchet pawls 222 in a disengaged position, depending on the number of forward ratchet pawls 222 and their spacing, the pawl stop 275 may be moved to contact the bottom surface 366 of the forward ratchet pawls 222, as best shown in FIG. 8.

Figure 9:
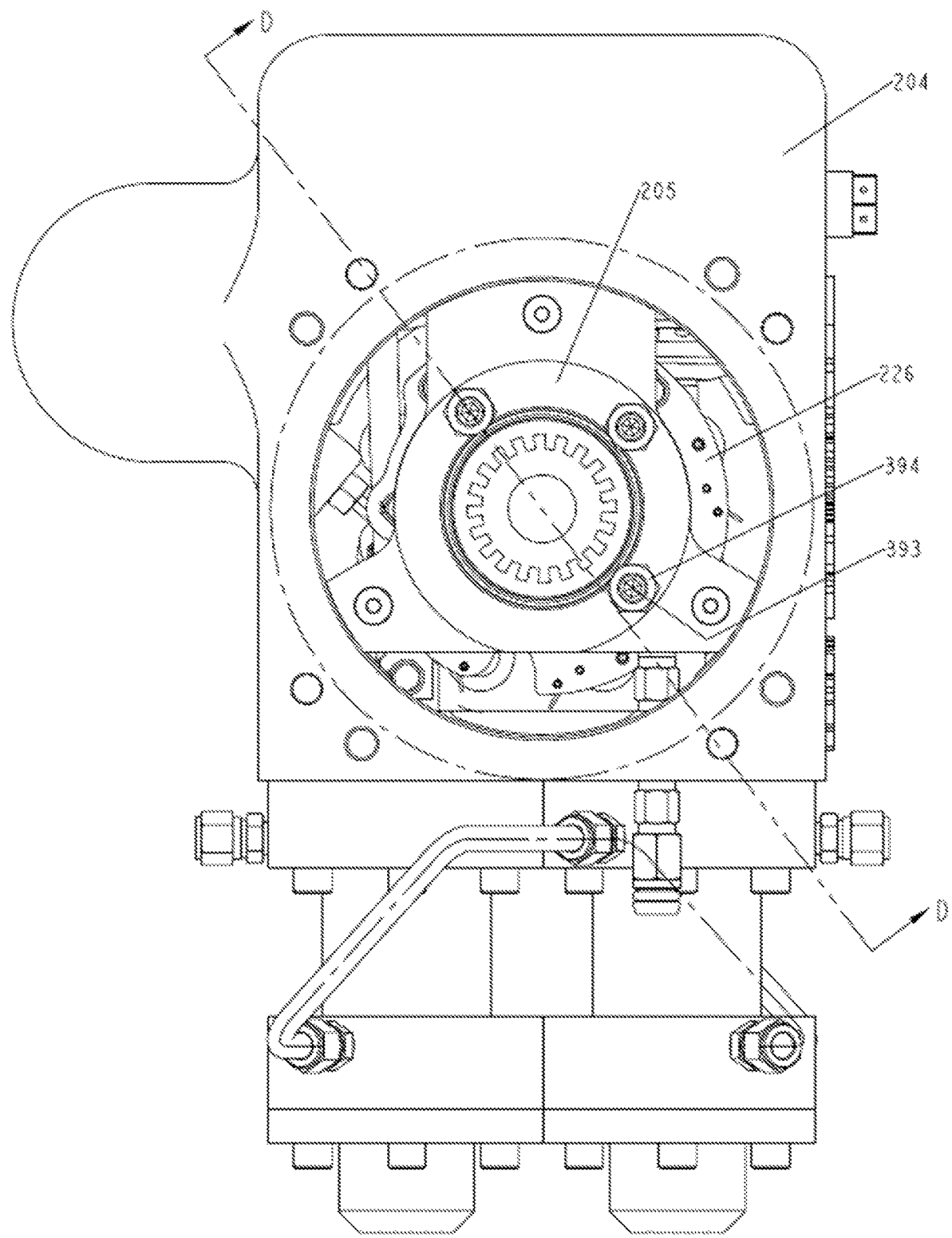
FIG. 9 is an end view of the actuator housing taken at the gear end of the drive shaft for connection to the ROV override mechanism, generally along line C-C of FIG. 6, but with some parts removed, and illustrating the connection of the pawl stops to the actuator housing.
Figure 11:
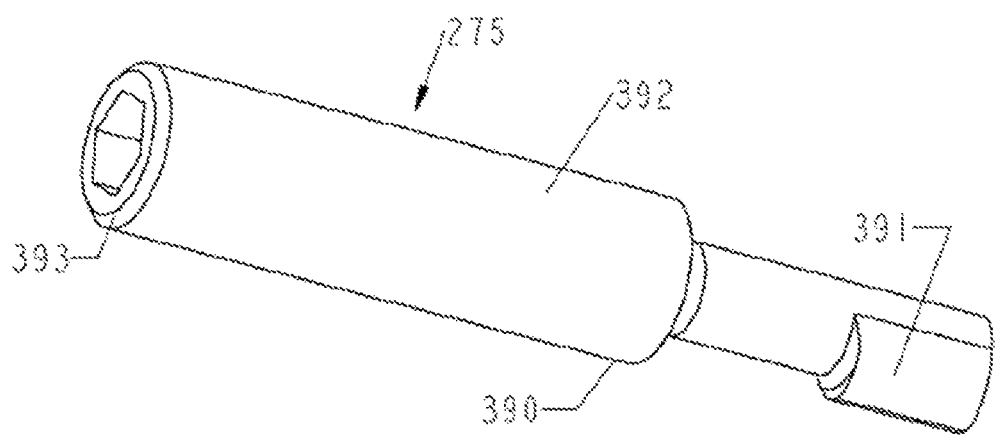
FIG. 11 is a perspective view of the pawl stop of previous figures illustrating the cam head portion to engage the bottom surface of the forward ratchet pawl.

The details for one embodiment of the pawl stop 275 are shown in FIGS. 8-11, 10 and 11. In FIG. 11, the pawl stop 275 is shown as a cam stop pin 390, having a cam head portion 391, a threaded body portion 392, and a connecting end 393. FIGS. 9 and 10 show the cam stop pin 390 connected to a housing cover 205 of the actuator housing 204 by locknuts 394. The cam stop pin 390 extends through a curved slot 227 in the drive collar 226, and positions the cam head portion 391 against the bottom surface 366 the forward ratchet pawl 222 at a point rearwardly of the notched portion 354 and forwardly of the pivot connection 350 to the drive collar 226. When the drive collar 226 is in between actuation cycles (as shown in FIG. 8), and the piston is fully retracted, the cam head portion 391 has a camming action against the bottom surface 366 of the forward ratchet pawl 222, to maintain the pawl 222 in the disengaged position, out of contact with the drive shaft 218. As the drive collar 226 is rotated during an actuation cycle, the forward ratchet pawl 222 is likewise rotated (in the clockwise direction in FIG. 8), and the cam head portion 391 of the pin 390 slides rearwardly against the bottom surface 366 toward the pivot connection 350, allowing the ratchet pawl 222 to pivot with the spring bias so as to move out of the disengaged position and into contact the drive shaft 218. While this rotation during the actuation cycle moves all of the forward ratchet pawls 222 out of the disengaged position, the angular spacing D of the forward ratchet pawls 222, as set out above, ensures that only one of the forward ratchet pawls 222 engages in one of the slots 220 so as to be in an engaged position, while the other two forward ratchet pawls 222 ride along the periphery of the drive shaft 218 formed between the slots 220.

Figure 12:
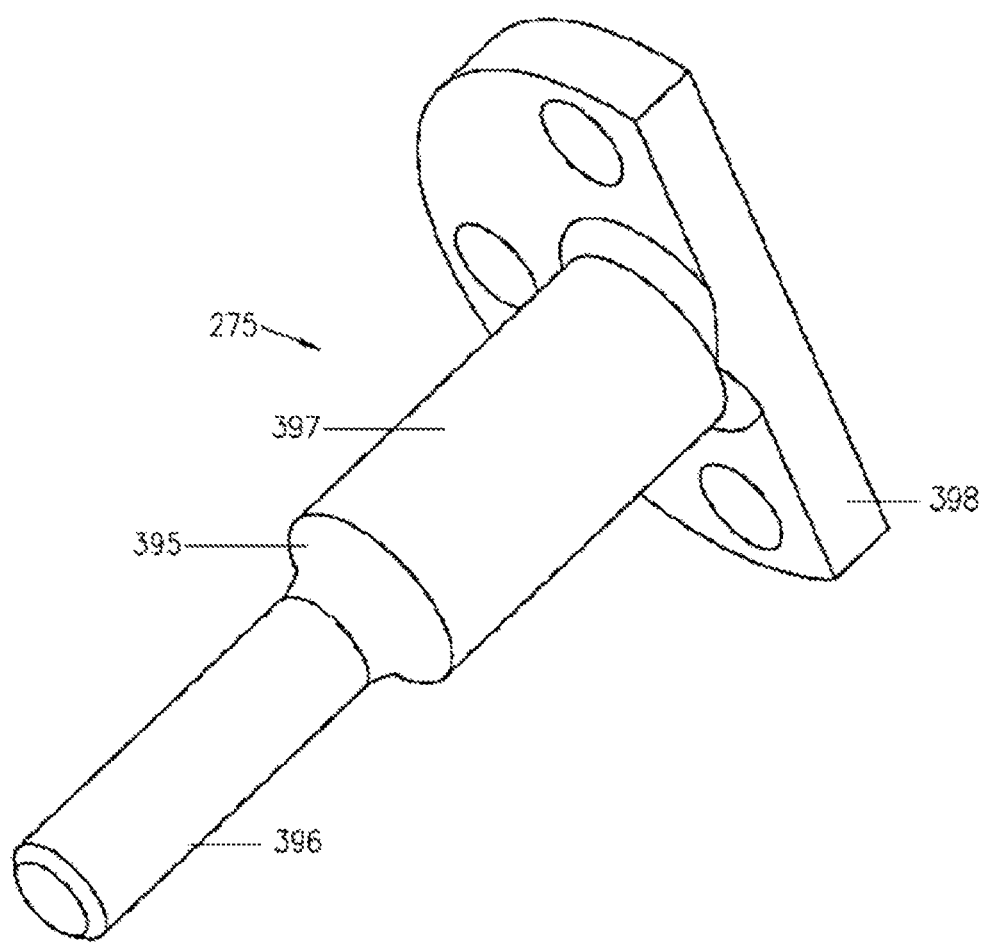
FIG. 12 is a perspective view of an alternate pawl stop to hold the forward ratchet pawls in the disengaged position.
Figure 13:
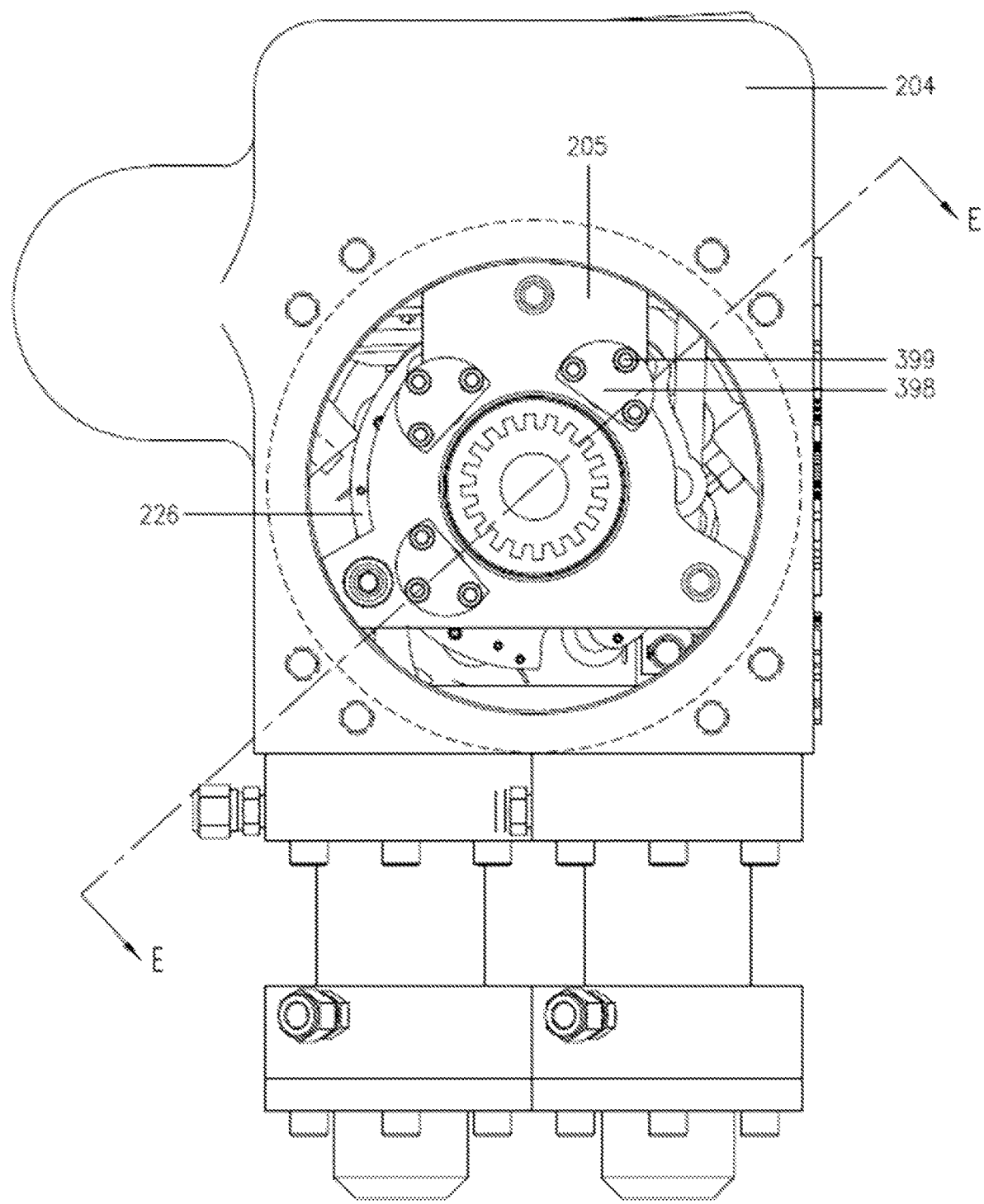
FIG. 13 is an end view similar to the view of FIG. 9, but showing the alternate pawl stops of FIG. 12.
Figure 14:
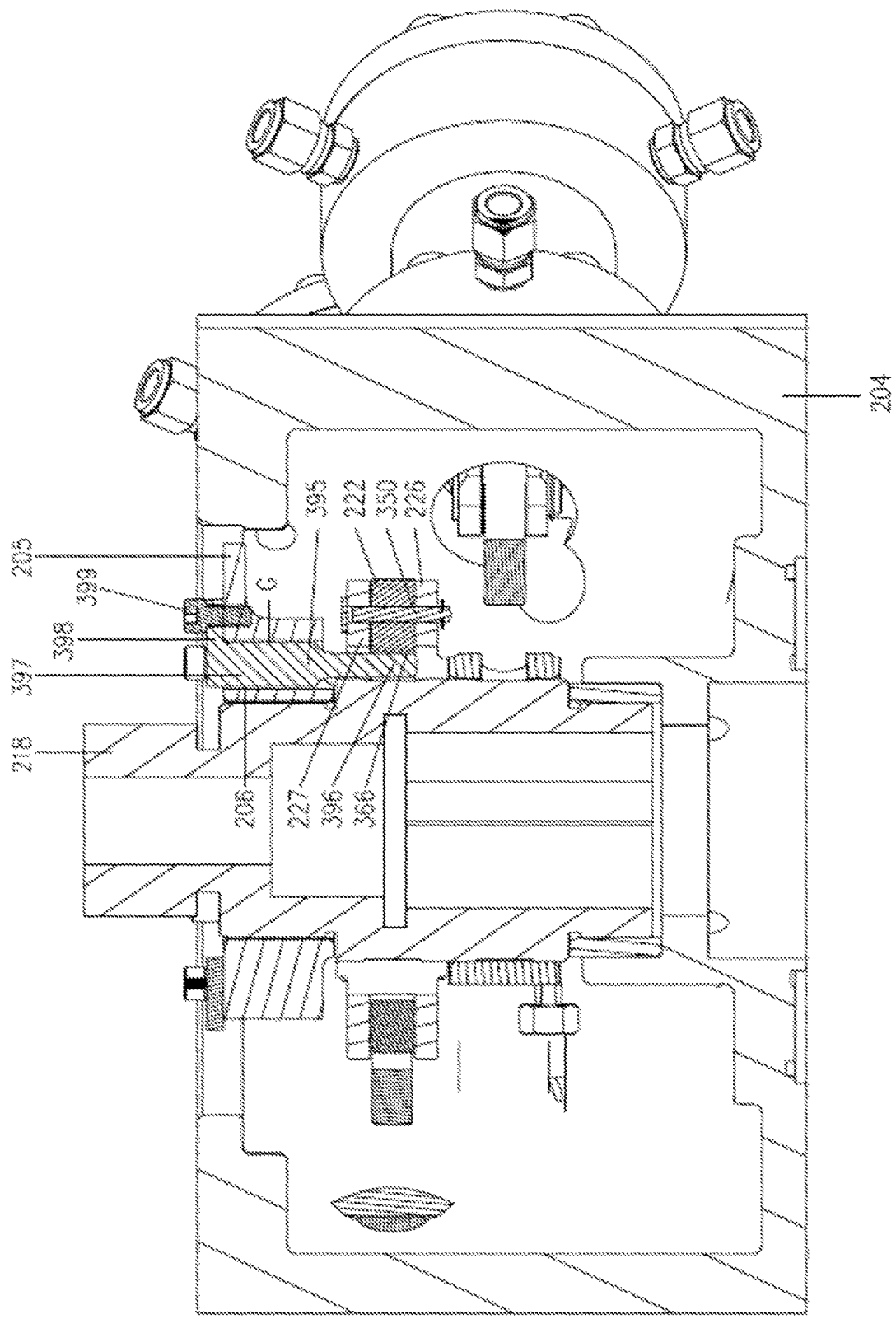
FIG. 14 is a sectional view taken along line E-E of FIG. 13, illustrating the alternate pawl stop connection in the actuator housing for one of the forward ratchet pawls.
Figure 15:
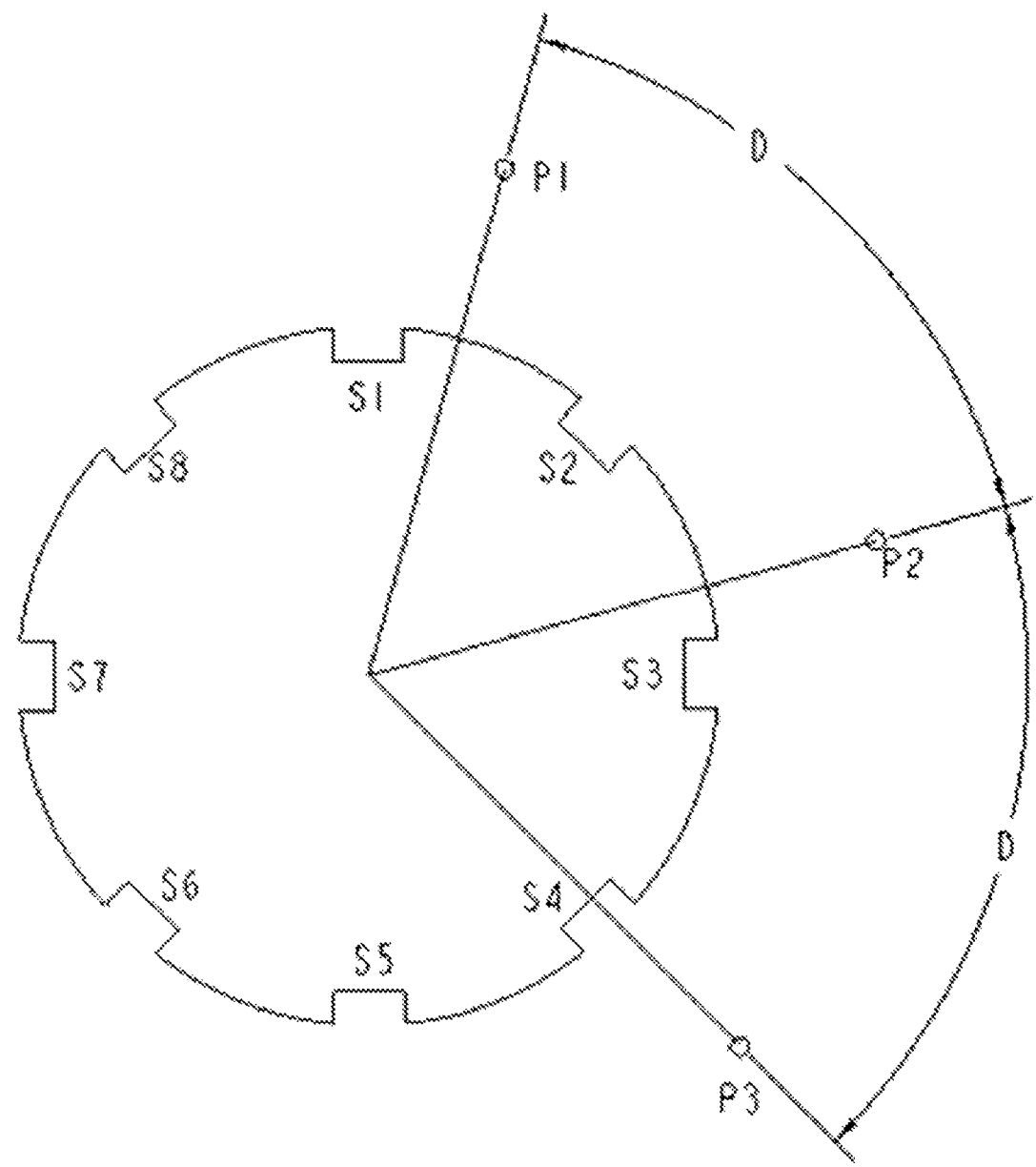
FIG. 15 is a schematic figure showing the relationship for the displacement angular spacing D between pivot centres of the multiple ratchet pawls.

An alternate embodiment of a pawl stop 275 is shown in FIGS. 12-14. The pawl stop 275 is shown in FIG. 12 as a bolted pawl pin 395, having a cylindrical head portion 396, a body portion 397 and a flange connecting portion 398. As shown in FIG. 14, the head portion 396 is adapted to extend through the curved slot 227 in the drive collar 226 to contact the bottom surface 366 of the forward ratchet pawl 222 rearwardly of the notched portion 354 and forwardly of the pivot connection 350. The body portion 397 extends through ports 206 in the actuator housing cover 205. The flange portion 398 is adapted for secure connection to the actuator housing cover 205 at multiple points (three point locknut connection 399 is shown in FIG. 13). During assembly, the contact between the head portion 395 and the ratchet pawls 222 is adjusted so that the pawls 222 are held in the disengaged position. To that end, the body portion 397 is adapted to leave a gap G in the ports 206. Prior to fastening the locknuts 399 on the flange portion, the gap G allows the head portion 396 to be moved in the X-Y direction, hard against the bottom surface 366 of the ratchet pawl 222. Once the pawl pin 395 is in position, the flange portion 398 is then securely connected to the actuator housing cover 205.

While the drive shaft 218 is described herein as unitary tubular component, it will be understood that the drive shaft could be formed as a split component, for example with a split between the first and second drive paths. For a split drive shaft, each drive shaft component is fixed, for example by keying, to the stem nut 210. A unitary tubular drive shaft 218 has the advantage of preventing play between the drive shaft 218 and the stem nut 210.

All references mentioned in this specification are indicative of the level of skill in the art of this invention. All references are herein incorporated by reference in their entirety to the same extent as if each reference was specifically and individually indicated to be incorporated by reference. However, if any inconsistency arises between a cited reference and the present disclosure, the present disclosure takes precedence. Some references provided herein are incorporated by reference herein to provide details concerning the state of the art prior to the filing of this application, other references may be cited to provide additional or alternative device elements, additional or alternative materials, additional or alternative methods of analysis or application of the invention.

As used herein and in the claims, the words "comprising", "including" and "having" are used in a non-limiting sense to mean that items following the word in the sentence are included and that items not specifically mentioned are not excluded. The use of the article "a", "an", "the", and "said" in the claims before an element means that one of the elements is specified, but does not specifically exclude others of the elements being present, unless the context clearly requires that there be one and only one of the elements. As well, the use of "top", "bottom", "above", "below", "rear", "front", "back", "forward", "reverse", "clockwise", "counterclockwise" and variations of these or other terms is made for convenience of description relative to component relative positioning in the drawings, but does not require only these particular orientations of the components.

The terms and expressions used are, unless otherwise defined herein, used as terms of description and not limitation. There is no intention, in using such terms and expressions, of excluding equivalents of the features illustrated and described, it being recognized that the scope of the invention is defined and limited only by the claims which follow. Although the description herein contains many specifics, these should not be construed as limiting the scope of the invention, but as merely providing illustrations of some of the embodiments of the invention.

One of ordinary skill in the art will appreciate that elements and materials other than those specifically exemplified can be employed in the practice of the invention without resort to undue experimentation. All art-known functional equivalents, of any such elements and materials are intended to be included in this invention. The invention illustratively described herein suitably may be practised in the absence of any element or elements, limitation or limitations which is not specifically disclosed herein.

The invention claimed is:

1. A valve system, comprising:
   a valve having a flow trim configured to be moved between open and closed positions;
   a rotary stepping actuator configured to open and close the flow trim of the valve by imparting stepwise rotation to an actuator drive shaft rotationally coupled to the flow trim through a stem nut and a valve stem in a manner to impart axial movement to the flow trim with each stepwise rotation of the drive shaft;
   a first actuation assembly moveable from a retracted position through a forward actuation cycle to incrementally rotate the drive shaft in a forward step;
   a second actuation assembly moveable from a retracted position through a reverse actuation cycle to incrementally rotate the drive shaft in a reverse step;
   an actuation control system configured to supply pressurized fluid to separately drive the first and second actuation assemblies to impart stepwise rotational movement to the drive shaft in the forward and reverse actuation cycles to move the flow trim in the forward and reverse steps between the open and closed positions;

the first actuation assembly being configured to impart stepwise rotational movement to the drive shaft such that the drive shaft is stepwise rotated by a predetermined angular increment or by a fraction of the predetermined angular increment for each forward step of the drive shaft; and the second actuation assembly being configured to impart stepwise rotational movement to the drive shaft such that the drive shaft is stepwise rotated by the predetermined angular increment or by the fraction of the predetermined angular increment for each reverse step of the drive shaft, but wherein one or both of the first and second actuation assemblies are configured to impart stepwise rotational movement to the drive shaft such that the drive shaft is stepwise rotated by the fraction of the predetermined angular increment.

2. The valve system of claim 1, wherein:

the predetermined angular increment is set by the spacing of a number of circumferentially-spaced openings in the drive shaft;

the first actuation assembly is configured to incrementally rotate the drive shaft in the forward actuation cycle for valve opening by imparting stepwise rotational movement to the drive shaft such that the drive shaft is stepwise rotated by the fraction of the predetermined angular increment; and the second actuation assembly is configured to incrementally rotate the drive shaft in the reverse actuation cycle for valve closing by imparting stepwise rotational movement to the drive shaft such that the drive shaft is stepwise rotated by the predetermined angular increment.

3. The valve system of claim 2, wherein:

the first actuation assembly is configured such that the forward actuation cycle selectively and sequentially engages and disengages each one of a plurality of forward ratchet pawls in one of the openings of the drive shaft to incrementally rotate the drive shaft by the fraction of the predetermined angular increment, while maintaining the other of the plurality of forward ratchet pawls disengaged from the openings;

the fraction is set by the number of the plurality of forward ratchet pawls; and the second actuation assembly is configured such that the reverse actuation cycle engages and disengages a single reverse ratchet pawl in one of the openings of the drive shaft to incrementally rotate the drive shaft by the predetermined angular increment.

4. The valve system of claim 1, further comprising:

(i) a valve body configured with an inlet and an outlet and having the flow trim configured to be moved axially by the valve stem between the closed position, wherein flow through the valve body is restricted, and the open position, wherein fluid may enter the valve body through the inlet, pass through the flow trim at reduced pressure, and continue through the outlet;

(ii) a stem/bonnet assembly connected to the valve body and including a bonnet disengagably connected with, and closing, an upper end of the valve body, the valve stem extending through the bonnet, the valve stem being externally threaded, and the stem nut being coaxial with the threaded valve stem and having internal threads cooperatively engaged with the externally threaded valve stem;

(iii) an actuator housing coupled to the stem/bonnet assembly and forming an entry port for sealed entry and rotational mounting of the stem nut;

(iv) the actuator drive shaft supported in the actuator housing for stepwise rotation, the drive shaft being co-axially aligned with, and configured to be rotatably coupled directly or indirectly to, the stem nut to impart rotation to the stem nut, the drive shaft forming at a periphery a first circular drive path and a second circular drive path co-axially spaced from the first drive path, each of the first and second drive paths comprising a number of outwardly-opening, circumferentially-spaced openings, the openings in the first and second drive paths being matched in number, size and spacing, wherein the spacing of the openings sets the predetermined angular increment for the stepwise rotation of the drive shaft;

(v) the first actuation assembly mounted in the actuator housing adjacent the first drive path of the drive shaft and moveable from the retracted position through the forward actuation cycle, and operative to releasably engage a forward ratchet pawl in one of the openings in the first drive path to incrementally rotate the drive shaft in a forward step;

(vi) the second actuation assembly mounted in the actuator housing adjacent the second drive path of the drive shaft and moveable from the retracted position through the reverse actuation cycle, and operative to releasably engage a reverse ratchet pawl in one of the openings in the second drive path to incrementally rotate the drive shaft in a reverse step;

(vii) the actuation control system coupled with the actuator housing and configured to supply pressurized fluid to separately drive the first and second actuation assemblies to impart rotational movement to the drive shaft in the forward and reverse actuation cycles to move the flow trim in the forward and reverse steps between the open and closed positions; and (viii) wherein one or both of the forward ratchet pawl and the reverse ratchet pawl is one of a plurality of ratchet pawls arranged in the first drive path or the second drive path such that in each of the forward or reverse actuation cycles for which a plurality of ratchet pawls is present, a first of the plurality of ratchet pawls engages in the opening while the other of the plurality of ratchet pawls remain disengaged from the opening, in order to incrementally rotate the drive shaft though a partial forward step or a partial reverse step which is a fraction of the predetermined angular increment, the fraction being set by the number of forward or reverse ratchet pawls in the plurality of ratchet pawls, and such that in each second or further forward or reverse actuation cycle for which a plurality of ratchet pawls is present, only a next one of the plurality of ratchet pawls engages in the opening, while the other of the plurality of ratchet pawls remain disengaged from the opening, in order to incrementally rotate the drive shaft through the partial forward or the partial reverse step, and so on for each further forward or reverse actuation cycle for which a plurality of ratchet pawls is present until each of the plurality of ratchet pawls has been engaged in the partial forward step or the partial reverse step, at which time the sum of the partial forward steps or the partial reverse steps achieved by engaging each one of the plurality of ratchet pawls is the predetermined angular increment set by the spacing of the openings.

5. The valve system of claim 4, wherein the plurality of ratchet pawls are circumferentially spaced in one or both of the first and second drive paths, with the spacing between the ratchet pawls being adapted to ensure that only one of the ratchet pawls is engaged in an opening while the remaining ratchet pawls remain disengaged from the opening.

6. The valve system of claim 5, wherein the spacing of the plurality of ratchet pawls is defined by the equation:

$$D=360*X/P*S,$$

wherein,
D is the angular spacing of the ratchet pawls,
X is a positive integer,
P is the number of ratchet pawls in the plurality of ratchet pawls, and
S is the number of openings,
provided that D is not a multiple of 360/S.

7. The valve system of claim 4, wherein the openings are slots extending axially along the rotational axis of the drive shaft.

8. The valve system of claim 7, wherein:
the number of slots is between 5 and 20 so that the predetermined angular increment is between about 18 and 72°.

9. The valve system of claim 7, wherein:
the number of slots in each of the first and second drive paths is 10 so that the predetermined angular increment imparted is about 36°; and
the number of the forward or reverse ratchet pawls is 3 arranged to provide the partial forward or reverse steps in angular increments of about 12°.

10. The valve system of claim 4, wherein the first actuation assembly includes the plurality of forward ratchet pawls and wherein the second actuation assembly includes a single reverse ratchet pawl, such that each forward actuation cycle provides the partial forward step which is the fraction of the predetermined angular increment, and each reverse actuation cycle provides the reverse forward step which is the predetermined angular increment.

11. The valve system of claim 10, wherein:
the actuation control system comprises two hydraulic cylinders connected to the actuator housing, each cylinder having a supply of hydraulic fluid and a piston adapted to extend into the actuator housing; and
the first and second actuation assemblies each comprise:
a drive collar mounted co-axially around either the first drive path or the second drive path for rotational movement in a radial arc about the first or second drive path;
the openings in the drive shaft being slots extending axially along the rotational axis;
each of the plurality of forward ratchet pawls and the single reverse ratchet pawl being pivotally connected with the drive collar and being spring biased to be pivotally movable between an engaged position within one of the slots of the first or second drive paths and a disengaged position released from the slot with each rotation of the drive collar; and
a connecting arm oriented tangentially to the drive collar and pivotally connected between the piston of one of the hydraulic cylinders and a compression spring, the connecting arm having a central portion pivotally connected to the drive collar, so that the supply of the hydraulic fluid to extend the piston causes the connecting arm to impart radial rotational movement to the drive collar in a driven step to move the one of the plurality of forward ratchet pawls or the single reverse ratchet pawls into the engaged position with one of the slots of the drive shaft, and retraction of the piston with the compression spring causes the connecting arm to impart radial rotational movement to the drive collar in a return step in an opposite direction to move the one of the plurality of forward ratchet pawls or the single reverse ratchet pawl into the disengaged position, released from the slot of the drive shaft.

12. The valve system of claim 11, wherein each of the plurality of forward ratchet pawls and the single reverse ratchet pawls is connected and positioned in the drive collar relative to the drive shaft and the slots such that, if the forward or reverse ratchet pawl to be engaged is not aligned with the slot to be engaged at the commencement of the forward or reverse actuation cycle, the forward or reverse ratchet pawl to be engaged remains temporarily out of engagement with the slot, and instead engages the periphery of the drive shaft to delay engaging the slot by the fraction or by a multiple of the fraction of the predetermined angular increment.

13. The valve system of claim 12, wherein:
the valve is a choke valve;
the drive shaft is rotationally coupled to, and co-axially aligned with, the stem nut having internal threads; and
the stem nut is rotationally coupled with the externally threaded valve stem such that the internal threads of the stem nut cooperatively engage the externally threaded valve stem, such that axial rotation of the stem nut produces axial movement of the threaded valve stem to move the flow trim between closed and open positions in accordance with rotation of the stem nut.

14. The valve system of claim 13, wherein:
each of the plurality of forward ratchet pawls and the single reverse ratchet pawl has a front portion, a back portion and a central portion, with an off center pivotal connection to the drive collar proximate the back portion, a top surface facing opposite the drive shaft and a bottom surface facing the drive shaft, the front portion forming a notched portion sized to fit into one of the slots of the drive shaft and having a front drive face and an opposed rear face; and
each slot, when viewed in cross section perpendicular to the rotational axis of the drive shaft, has a front wall, a rear wall and a connecting bottom wall, such that during the driven step of the drive collar the front wall of the slot is engaged by the front drive face of the ratchet pawl to impart stepwise rotational movement to the drive shaft, and during the return step of the drive collar an outer lip of the rear wall of the slot contacts the rear face of each of the forward and reverse ratchet pawls to pivot the forward or reverse ratchet pawl to release from the slot so that no further movement is imparted to the drive shaft.

15. The valve system of claim 14, wherein the rear face of the notched portion of each of the forward and reverse ratchet pawls is tapered toward the slot to assist in releasing the forward and reverse ratchet pawl from the slot.

16. The valve system of claim 15, wherein each slot is generally rectangular shaped in a cross section perpendicular to the rotational axis and the outer lip of the rear wall of the slot has a cut away portion or taper to assist in release of each of the forward and reverse ratchet pawls and to limit wear of the slot and of each of the forward and reverse ratchet pawls.

17. The valve system of claim 15, further comprising:
a pawl stop pin mounted in the actuator housing arranged to contact a back face formed on the back portion of the single reverse ratchet pawl to hold the single reverse ratchet pawl in the disengaged position, out of contact with the drive shaft, against the spring bias on the reverse ratchet pawl; and
a plurality of pawl stops mounted in the actuator housing, each pawl stop extending through a curved slot in the drive collar and arranged to contact the bottom surface of one of the plurality of forward ratchet pawls between the notched portion and the pivot connection to hold the forward ratchet pawl in the disengaged position, out of contact with the drive shaft, against the spring bias on the forward ratchet pawl.

18. The valve system of claim 17, wherein the drive collar includes a torsional spring at the periphery to press against the top surface of each of the forward and reverse ratchet pawls to bias the ratchet pawl into engagement with the slot of the drive shaft.

19. The valve system of claim 17, wherein the pawl stop is a pin having a cam surface which provides a camming action against the bottom surface of the forward ratchet pawl.

20. The valve system of claim 17, wherein the drive collar has a pawl limit pin at the periphery parallel to the axis of rotation of the drive collar to contact the top surface of each of the forward and reverse ratchet pawls to limit pivotal movement of each of the forward and reverse ratchet pawls in the disengaged position.

21. The valve system of claim 4, wherein the valve body, valve stem and flow trim components are configured in a choke valve comprising:
a hollow valve body assembly having an inlet bore and an outlet bore substantially at right angles, and forming a main bore which is an extension of the outlet bore and which communicates with the inlet bore;
the flow trim positioned in the main bore, the flow trim comprising a stationary tubular cage having a side wall, and an external cylindrical flow collar adapted for sliding movement along the side wall of the cage, the side wall of the cage forming an internal bore aligned with the outlet bore and having a ported portion between its ends formed with one or more flow ports, the external flow collar being adapted for movement between a closed position, wherein the one or more flow ports are fully covered by the external flow collar, and an open position, wherein each of the flow ports is fully or partially uncovered by the external flow collar, whereby fluid may enter the valve through the inlet bore, pass through the one or more flow ports at reduced pressure and continue through the outlet bore;
the bonnet disengagably connected with, and closing, an upper end of the valve body; and
the externally threaded valve stem configured to bias the external flow collar over the one or more flow ports.

22. The valve system of claim 21, wherein the one or more flow ports are arranged to include one or more pairs of diametrically opposed main flow ports.

23. The valve system of claim 22, wherein there is one pair of diametrically opposed main flow ports.

24. The valve system of claim 21, which further comprises a tubular sleeve positioned in the main bore across the inlet bore and forming at least one side port communicating with the inlet bore, the flow trim being positioned within the tubular sleeve, and wherein the bonnet closes the upper end of both the valve body and the tubular sleeve.

25. The valve system of claim 24, wherein the at least one side port is aligned with the inlet bore, and one pair of the one or more pairs of the diametrically opposed main flow ports is arranged such that a line through a midpoint of the diametrically opposed main flow ports is parallel to a centre axis of the inlet bore.

26. The valve system of claim 25, further comprising:
at least a pair of diametrically opposed secondary flow ports formed in the side wall of the cage, the secondary flow ports having a smaller diameter than a diameter of the main flow ports and each pair of secondary flow ports being positioned with an axis which is offset by 90° from the axis of one of the pairs of main flow ports and closer to the body outlet than are the main flow ports.

27. The valve system of claim 24, wherein:
the inlet bore and the outlet bore are arranged in a T-shape to provide a body side inlet, a body outlet and an insert chamber at the intersection of the body side inlet and the body outlet; and
the tubular sleeve and the flow trim are arranged as a removable insert assembly positioned in the insert chamber, the insert assembly comprising:
a) the tubular sleeve being adapted as a tubular cartridge having a side wall forming an internal bore and the at least one side port communicating with the body side inlet, whereby fluid may enter through the at least one side port from the body side inlet;
b) the flow trim being positioned in the cartridge internal bore, the flow trim comprising the tubular cage aligned with the body outlet, and the external flow collar slidable along the side wall of the cage, the cage side wall forming the one or more pairs of diametrically opposed main flow ports located to overlap the intersection of the axes of the body side inlet and the body outlet, and aligned with the at least one side port of the tubular cartridge to communicate with the side port, whereby fluid from the body side inlet may enter the cage bore at reduced pressure and pass through the body outlet;
c) the bonnet being disengagably connected with, and closing, the upper end of the tubular cartridge and the body; and
d) the externally threaded valve stem being configured to bias the flow collar over the main flow ports.

28. The valve system of claim 27, further comprising:
at least a pair of diametrically opposed secondary flow ports formed in the side wall of the cage, the secondary flow ports having a smaller diameter than a diameter of the main flow ports and each pair of secondary flow ports being positioned with an axis which is offset by 90° from the axis of one of the pairs of main flow ports and the secondary flow ports being arranged closer to the body outlet than are the main flow ports.

29. A rotary stepping actuator comprising the components (iii)-(viii) of claim 4.

30. A method of opening and closing the flow trim of a valve with a rotary stepping actuator by imparting stepwise rotation to an actuator drive shaft rotationally coupled to the flow trim through a stem nut and a valve stem in a manner to impart axial movement to the flow trim with each stepwise rotation of the drive shaft, the method comprising:
supplying pressurized fluid to stepwise and separately drive a first actuation assembly moveable from a retracted position through a forward actuation cycle to incrementally rotate the drive shaft in a forward step and a second actuation assembly moveable from a retracted position through a reverse actuation cycle to incrementally rotate the drive shaft in a reverse step to impart stepwise rotational movement to the drive shaft in the forward and reverse actuation cycles to move the flow trim in the forward and reverse steps between the open and closed positions, wherein the first actuation assembly imparts stepwise rotational movement to the drive shaft such that the drive shaft is stepwise rotated by a predetermined angular increment or by a fraction of the predetermined angular increment for each forward step of the drive shaft; and wherein the second actuation assembly imparts stepwise rotational movement to the drive shaft such that the drive shaft is stepwise rotated by the predetermined angular increment or by the fraction of the predetermined angular increment for each reverse step of the drive shaft, but wherein one or both of the first and second actuation assemblies impart stepwise rotational movement to the drive shaft such that the drive shaft is stepwise rotated by the fraction of the predetermined angular increment.

31. The method of claim 30, wherein the predetermined angular increment is set by the spacing of a number of circumferentially-spaced openings in the drive shaft, and wherein the method includes:

incrementally rotating the drive shaft in the forward actuation cycle for valve opening by imparting stepwise rotational movement to the drive shaft such that the drive shaft is stepwise rotated by the fraction of the predetermined angular increment, and incrementally rotating the drive shaft in the reverse actuation cycle for valve closing by imparting stepwise rotational movement to the drive shaft such that the drive shaft is stepwise rotated by the predetermined angular increment.

32. The method of claim 31, wherein:

the forward actuation cycle selectively and sequentially engages and disengages each one of a plurality of forward ratchet pawls in one of the openings to incrementally rotate the drive shaft by the fraction of the predetermined angular increment, while maintaining the other of the plurality of forward ratchet pawls disengaged from the openings;

the fraction is set by the number of the plurality of forward ratchet pawls; and the reverse actuation cycle engages and disengages a single reverse ratchet pawl in one of the openings to incrementally rotate the drive shaft by the predetermined angular increment.

* * * * *